(12) United States Patent
Hicks et al.

(10) Patent No.: US 8,856,033 B2
(45) Date of Patent: Oct. 7, 2014

(54) MOBILE BARCODE SCANNER GUN SYSTEM WITH MOBILE TABLET DEVICE HAVING A MOBILE POS AND ENTERPRISE RESOURCE PLANNING APPLICATION FOR CUSTOMER CHECKOUT/ORDER FULFILLMENT AND REAL TIME IN STORE INVENTORY MANAGEMENT FOR RETAIL ESTABLISHMENT

(71) Applicants: Bruce J. Hicks, Windermere, FL (US); Brian K. McWhirter, Winter Garden, FL (US); DeVan McArthur, Gulf Breeze, FL (US); Bromley Williams, Orlando, FL (US)

(72) Inventors: Bruce J. Hicks, Windermere, FL (US); Brian K. McWhirter, Winter Garden, FL (US); DeVan McArthur, Gulf Breeze, FL (US); Bromley Williams, Orlando, FL (US)

(73) Assignee: Retail Technologies Corporation, Orlando, FL (US)

( * ) Notice: Subject to any disclaimer, the term of this patent is extended or adjusted under 35 U.S.C. 154(b) by 0 days.

(21) Appl. No.: 13/783,089

(22) Filed: Mar. 1, 2013

(65) Prior Publication Data
US 2014/0249942 A1 Sep. 4, 2014

(51) Int. Cl.
| | | |
|---|---|---|
| *G06Q 20/00* | (2012.01) | |
| *G06F 19/00* | (2011.01) | |
| *G06Q 30/00* | (2012.01) | |
| *G06Q 90/00* | (2006.01) | |
| *G06Q 20/20* | (2012.01) | |

(52) U.S. Cl.
CPC .................................. *G06Q 20/20* (2013.01)
USPC ......................................... 705/17; 235/385

(58) Field of Classification Search
CPC ................ G06F 1/1626; G06Q 10/063118; G06Q 10/06; G06K 7/1091
USPC ........................................... 705/17; 235/385
See application file for complete search history.

(56) References Cited

U.S. PATENT DOCUMENTS

| | | | |
|---|---|---|---|
| 5,324,922 A | 6/1994 | Roberts | 235/375 |
| 6,853,293 B2 | 2/2005 | Swartz et al. | 340/5.92 |
| 7,010,501 B1 | 3/2006 | Roslak et al. | 705/23 |
| 7,264,168 B2 * | 9/2007 | He | 235/462.45 |

(Continued)

OTHER PUBLICATIONS

"PAYware Mobile Enterprise" found at http://www.verifone.com/products/hardware/mobile/payware-mobile-enterprise.

(Continued)

*Primary Examiner* — Seye Iwarere
(74) *Attorney, Agent, or Firm* — Ernest D. Buff & Assoc. LLC; Ernest D. Buff, Esq.; Margaret A. LaCroix, Esq.

(57) ABSTRACT

A mobile scanner gun system efficiently and reliably processes a retail store purchase and/or performs daily store inventory management functions. The system has a main body portion extending toward a handle portion, the main body portion having a base, side walls, a front wall and a back wall constructed to form an interior cavity, wherein the front wall includes an aperture with a lens recessed therein. The front wall has a trigger member located near the base of the main body. A USB MSR input device integrated on the short edge of the mobile tablet device (upper receiver) is used for processing payment card sales transactions through a secured PCI compliant, end to end encrypted bank card processor. The mobile tablet device has a system integrated therein that enables real-time store level inventory management and fully functioning POS capability for selling merchandise in a retail sales environment.

30 Claims, 24 Drawing Sheets

(56) References Cited

U.S. PATENT DOCUMENTS

| | | | |
|---|---|---|---|
| 7,913,912 B2 | 3/2011 | Do et al. | 235/472.01 |
| 8,144,456 B1* | 3/2012 | Kunert et al. | 361/679.37 |
| 8,235,289 B2 | 8/2012 | Hsu et al. | 235/383 |
| 8,235,294 B2 | 8/2012 | Miller et al. | 235/472.02 |
| 8,250,187 B2 | 8/2012 | Cacheria, III et al. | 709/221 |
| 8,255,499 B2 | 8/2012 | Cacheria, III et al. | 709/221 |
| 8,255,500 B2 | 8/2012 | Cacheria, III et al. | 709/221 |
| 2002/0003167 A1* | 1/2002 | Cheng | 235/472.01 |
| 2004/0233930 A1* | 11/2004 | Colby, Jr. | 370/464 |
| 2004/0245334 A1* | 12/2004 | Sikorski | 235/383 |
| 2005/0120214 A1* | 6/2005 | Yeates et al. | 713/171 |
| 2006/0036490 A1* | 2/2006 | Sagalyn | 705/14 |
| 2007/0074043 A1* | 3/2007 | Lacey | 713/186 |
| 2008/0208758 A1* | 8/2008 | Spiker et al. | 705/70 |
| 2008/0248865 A1* | 10/2008 | Tedesco et al. | 463/25 |
| 2008/0249899 A1* | 10/2008 | Nasser | 705/28 |
| 2009/0060199 A1* | 3/2009 | von Mueller et al. | 380/278 |
| 2010/0007496 A1* | 1/2010 | Orlassino | 340/572.1 |
| 2011/0054904 A1* | 3/2011 | Fenton | 704/270 |
| 2011/0208599 A1* | 8/2011 | Sen et al. | 705/16 |
| 2011/0290876 A1* | 12/2011 | Graves et al. | 235/385 |
| 2011/0295411 A1* | 12/2011 | Rotella et al. | 700/216 |
| 2012/0072350 A1 | 3/2012 | Goldthwaite et al. | 705/44 |
| 2012/0095805 A1* | 4/2012 | Ghosh et al. | 705/7.34 |
| 2012/0138686 A1* | 6/2012 | Madej et al. | 235/462.27 |
| 2012/0191775 A1* | 7/2012 | Ewe | 709/203 |
| 2012/0209749 A1 | 8/2012 | Hammad et al. | 705/27.1 |
| 2012/0284131 A1 | 11/2012 | Soffer et al. | 235/375 |
| 2012/0296741 A1 | 11/2012 | Dykes | 705/17 |
| 2012/0298740 A1 | 11/2012 | Hsu et al. | 705/14.53 |
| 2013/0030933 A1 | 1/2013 | Talach et al. | 705/17 |
| 2013/0179307 A1* | 7/2013 | Heil et al. | 705/27.1 |

OTHER PUBLICATIONS

"Infinite Peripherals IPC_Infinea_Tab_Spec.pdf" found at http://www.ipclineapro.com/infinea-tab-ipad/.

* cited by examiner

Figure 16
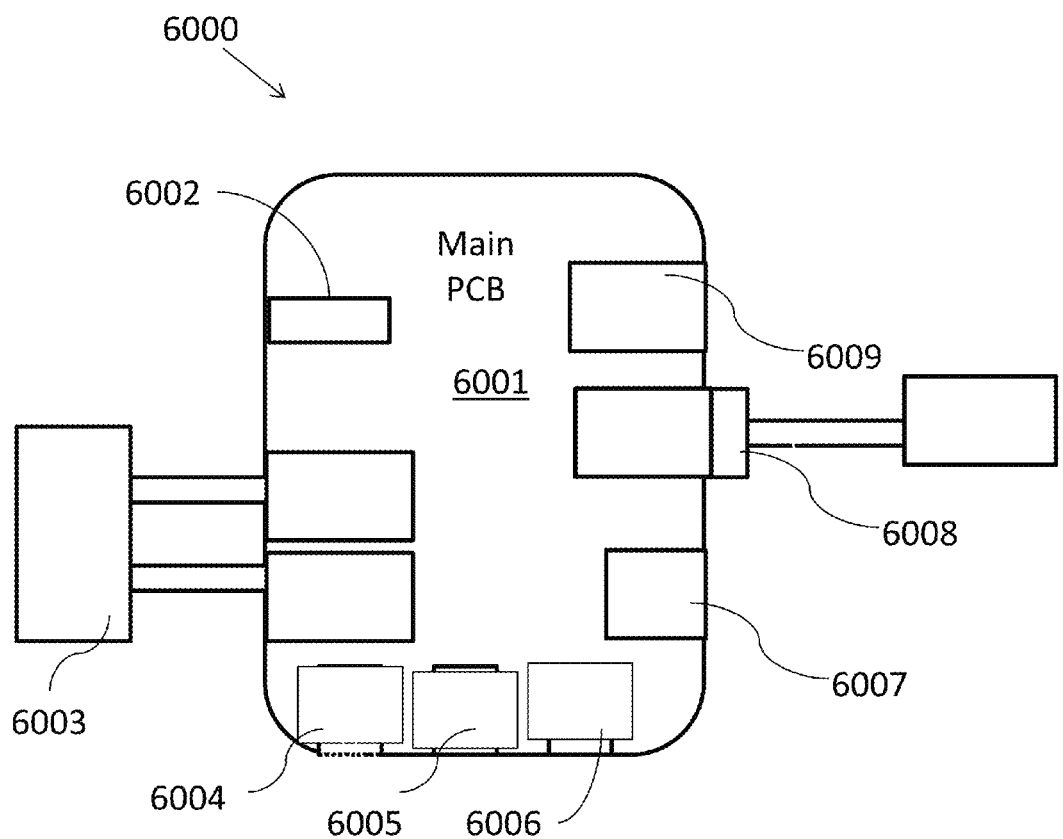
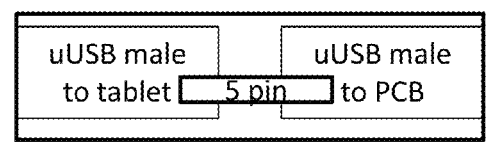
*All connectors are females on PCB

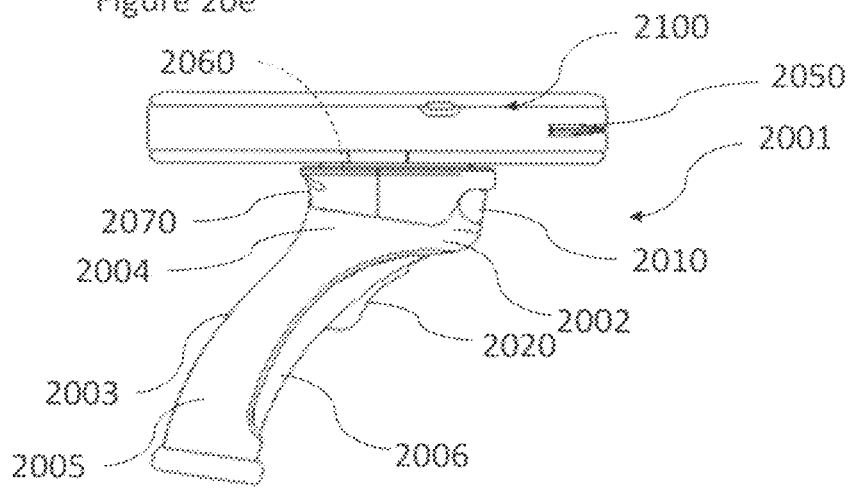
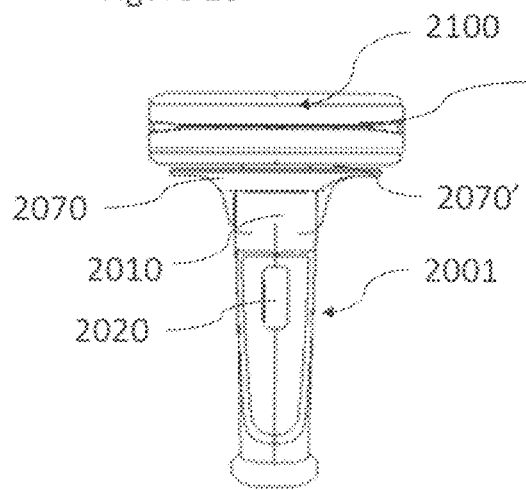
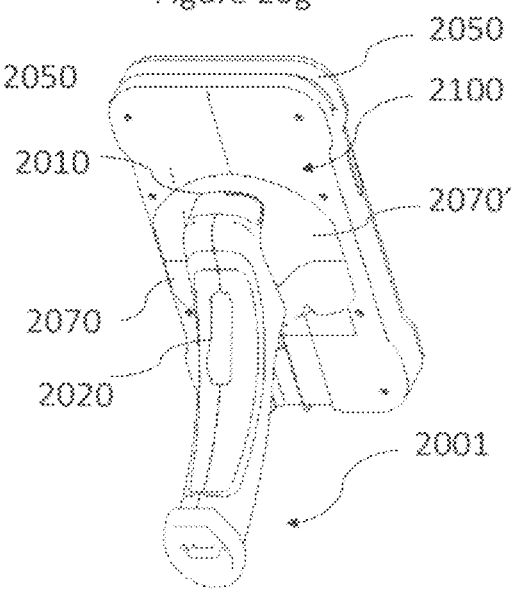

MOBILE BARCODE SCANNER GUN SYSTEM WITH MOBILE TABLET DEVICE HAVING A MOBILE POS AND ENTERPRISE RESOURCE PLANNING APPLICATION FOR CUSTOMER CHECKOUT/ORDER FULFILLMENT AND REAL TIME IN STORE INVENTORY MANAGEMENT FOR RETAIL ESTABLISHMENT

CROSS-REFERENCE TO RELATED APPLICATIONS

This is Nonprovisional Patent Application is related to Applicant's U.S. Nonprovisional application Ser. No. 13/783,058 entitled "Mobile Scanner Gun System With Mobile Tablet Having A Mobile Pos And Enterprise Resource Planning Application For Pos Customer Order Fulfillment And In Store Inventory Management For Retail Establishment,"; U.S. Nonprovisional application Ser. No. 13/783,110 entitled "Wearable Mobile Scanner System With Mobile Tablet Having A Mobile Pos And Enterprise Resource Planning Application For Pos Customer Order Fulfillment And Method In Store Inventory Management For Retail Establishment, "; U.S. Nonprovisional application Ser. No. 13/783,119 entitled "Wearable Mobile Scanner System With Mobile Tablet Having A Mobile Pos And Enterprise Resource Planning Application For Pos Customer Order Fulfillment And In Store Inventory Management For Retail Establishment, "; and U.S. application Ser. No. 13/783,127 entitled "Store Mobile Cloud Application System For Inventory Management And Customer Order Fulfillment And Method For Retail Establishment,", which Nonprovisional applications are co-pending and filed on the same date herewith, and the disclosures of which co-pending Nonprovisional applications are hereby specifically incorporated herein by reference thereto.

This Nonprovisional patent application claims the benefit of the filing date for U.S. Provisional Application No. 61/751,906, filed Jan. 13, 2013, the disclosure of which is hereby specifically incorporated in its entirety by reference thereto.

FIELD OF THE INVENTION

The system and method of the present invention relates to mobile barcode scanner guns for sales transactions; and, more particularly to software systems implemented by barcode readers, inventory and point of sale devices for use in retail establishments.

DESCRIPTION OF THE PRIOR ART

Current retail systems utilize various types of barcode readers, tablets; register stations and Point-of-Sale (POS) devices. For example, one particularly common type of barcode reading device is that used at the checkout register or register station of a store, displaying the price of an item to the checkout clerk, who can then process the sale. Other frequently utilized barcode reading devices can be found at various kiosks in a store wherein a customer can scan an item for a price-check, however these kiosk barcode reading devices do not process the sale, and only provide the ability to view the price of the item scanned. Generally, the check-out counter or register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these bar code scanning devices and software implemented therein, fail to provide a combination of mobile technology with POS technology, and further fail to provide the ability to manage inventory throughout the retailer's franchise.

Another type of barcode reading device is a mobile handheld scanner, which is used by store and warehouse associates to manage inventory tasks such as physical inventory, cycle counting, inventory receiving, store to store transfers, return to vendor and product ticketing. However, these devices are only used for inventory management and have no ability to process sales.

Various systems and devices heretofore disclosed and utilized are set forth hereinafter.

U.S. Pat. No. 6,853,293 to Swartz et al. discloses a wearable communication system. A portable data input or computer system includes an input/output device such as a keyboard and a display, as well as another data input device such as an optical barcode scanner, and a data processor module. To scan barcode type indicia, the operator points the scanner at the barcode and triggers the scanner to read the indicia. Each of the system components is distributed on an operator's body and collectively form a personal area system (PAS). Components may include a scanner or imager, a wrist unit, a headpiece including an eyepiece display, speaker and a microphone. Components within a particular PAS communicate with each other over a personal area network (PAN). Individual PASs may be combined into a network of PASs called a PAS cluster. PASs in a particular PAS cluster can communicate with each other over another wireless communication channel. Individual PAS can gain access to a Local Area Network (LAN) and/or a Wide Area Network (WAN) via an access point. Individual PASs can use devices, such as servers and PCs situated either on the LAN or the WAN to retrieve and exchange information. Individual PAS components can provide automatic speech and image recognition. PAS components may also act a telephone, a pager, or any other communication device having access to a LAN or a WAN. Transmission of digitized voice and/or video data can be achieved over an Internet link. The wearable communication system has a CPU and communicates by wireless communication with a trigger worn elsewhere. No tablet is provided, and the system does not communicate barcode information or payment card information wirelessly to a main computer in a retail environment.

U.S. Pat. No. 7,010,501 to Roslak et al. discloses a personal shopping system. The personal shopping system is designed for combined use in both the home of a user and a shopping establishment. The system includes a host computer which is coupled to a host modem and, optionally, to at least one wireless multi-access point. The portable terminal can be used in both the shopping establishment and the home of the user. It is configured to read barcodes associated with items related to shopping, and includes a memory, a barcode reader, a wireless transceiver, and a data interface. The data interface of the terminal communicates with a data interface of the shopping establishment kiosk cradle or directly with the shopping establishment's communications network. This portable terminal communicates with a kiosk and has a very limited range of communication. The portable terminal has a barcode scanner but does not transmit scanned barcode data to a central corporate Enterprise Resource Planning (ERP) system in the retail shopping establishment. Moreover, the portable terminal does not have a tablet or an input device, and does not accept swiping of a magnetic payment card.

U.S. Pat. No. 7,913,912 to Do et al. discloses on-demand point-of-sale scanner access. The access system associates or disassociates a mobile point-of-sale scanner device with a particular shopper. Shoppers may be identified, for example, using biometrics or by scanning a loyalty card. As an example of using biometrics, the shopper's fingerprint may be scanned at the same time as a trigger of the scanner is activated to scan an item's barcode. The fingerprint is preferably transmitted, along with the scanned barcode, to a server or other device for comparison to previously-stored information. The scanner is then automatically associated with the shopper to whom the fingerprint corresponds. In another embodiment, scanned loyalty card information is preferably transmitted (optionally, along with a scanned barcode), such that the scanner is then automatically associated with the shopper to whom the loyalty card corresponds. Disassociating the scanner from a shopper is preferably triggered using a sensor (such as a light) that forms part of the scanner device, whereby the sensor is activated when the shopper releases the scanner device. A timer may be used to filter out accidental activation of the sensor. The on-demand point-of-sale scanner access employs a procedure that merely associates the biometric data of the user with a scan gun that is used for scanning an item to be purchased. Since the biometric data of the user is previously stored in the main computer, the purchase of the scanned item is added to the list of purchased items. The scanning operation is not carried out by the employee of a retail establishment, and the details of the product are not presented to the customer. Merely scanning an object adds the scanned object to the purchased list, and the customer has no means to delete the item from the purchased list. The scanner does not have a tablet attached thereto.

U.S. Pat. No. 8,235,294 to Miller et al. discloses an accuracy-enhanced scanner This accuracy-enhanced scanner provides, in response to a first user input, illumination of potential scan targets and, in response to a second user input, scans a selected scan target. The user employs the illumination to aim the scanner at the selected scan target in between providing the first and the second user inputs. The scanner has switches to communicate the user inputs, to specify an operating mode for the scanner, and/or to communicate information codes to a computing device. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner Scanners of various types are mounted on a ring powered by a wrist worn device. The device does not have a tablet attached to an input device. Even though the ring is said to have a magnetic stripe reader (MSR), there is no indication where this operation can be carried out.

U.S. Pat. Nos. 8,250,187, 8,255,499 and 8,255,500 to Cacheria III, et al. disclose a distributed transaction system. This system is operative to interface predetermined services to a user at a fixed location, and includes a processing platform running an operating system. Also included are pluralities of physical system resource interfaces for interfacing with available physical system resources. The physical system resources allow a user to gain access to the predetermined desired services. The system further includes a data store for storing configuration information that enables the operating system to interface with the available physical system resources through the physical system resource interface associated therewith. A communication resource for interfacing with the operating system allows communication of the operating system with a central office for downloading configuration information to selectively enable ones of the available physical system resources to interface with the operating system through associated ones of the physical system resource interfaces in accordance with the configuration information and the predetermined service selected by a user. A plurality of configurations is stored in the data store, and each is associated with a predetermined service and one or more of the available physical system resources. Each physical system resource interface is uniquely associated with a defined one of the physical system resources. This method has a number of terminals or service providers interacting with a central processor, which can communicate with banks and other financial institutions authorizing credit purchases. While verification of customer at terminal 110 is indicated, '110' is not an employee present on the retail store environment. Also, the terminals are not associated with a barcode scanner and/or mobile tablet device having barcode scanning and magnetic payment card swiping features. There is no employee in the retail location that has a barcode scanner scanning a particular object of interest to a customer, to provide full details of the product, its price and available promotions.

U.S. Patent Application Publication No. 20120209749 to Hammad et al. discloses a snap mobile payment apparatus, methods and systems. This snap mobile payment (SNAP) system transforms real-time-generated merchant-product Quick Response (QR) codes via SNAP components into virtual wallet card-based transaction purchase notifications. In one embodiment, the SNAP obtains a snapshot of a QR code presented on a display screen of a point-of-sale device from a mobile device. The SNAP decodes the QR code to obtain product information included in a checkout request of the user, and merchant information for processing a user purchase transaction with a merchant providing the QR code. The SNAP accesses a user virtual wallet to obtain user account information to process the user purchase transaction with the merchant. Using the product information, merchant information and user account information, the SNAP generates a card authorization request, and which the SNAP provides to a payment network for transaction processing. Also, the SNAP obtains a purchase receipt confirming processing of the user purchase transaction. The snap mobile payment apparatus, methods and systems require the user to present the QR code and the virtual wallet to make a purchase. This requires the customer to take a picture of the QR code and show it at the sales kiosk register or bring the product to the sales kiosk, a cumbersome operation. There is no employee in the retail location that has a barcode scanner with a tablet adapted for scanning a particular object of interest to a customer, to provide full details of the product, its price and available promotions.

Non-Patent Literature "Infinite Peripherals IPC_Infinea_Tab_Spec.pdr at http://ipclineapro.com/infinea-tab-ipad/discloses a tablet that is attached to a swivel head and has an application for barcode scanning, magnetic card reading. The IPC Infinea Tab is clearly a stand for attaching a tablet. The Infinea tab has active scanning, active barcode reader, and active search magnetic card reader. It has two buttons for starting the scan operation. It is not indicated to receive a command from a barcode scanner to scan a barcode or read a magnetic card. Further, the Application in the tablet does not communicate with a central corporate ERP system within the retail location to determine detailed description of a scanned product; determine its inventory, price and promotions. Furthermore, it does not also allow the POS store systems server to process a payment card transaction for the purchase of a product.

U.S. Pat. No. 8,235,289 and U.S. Patent App. Pub. No. 20120298740 to Hsu et al. disclose point of sale terminals generally including a housing including at least first and second housing portions which are arranged for relative axial movement from a closed position to an open position, the first housing portion including at least a communications interface adapted for operative communications engagement with a mobile communicator and a first housing portion socket adapted for partially surrounding the mobile communicator, the second housing portion including a second housing portion socket adapted for partially surrounding the mobile communicator and the first and second housing portions being configured such that when they are arranged in the closed position the first housing portion socket and the second housing portion socket together hug the mobile communicator and prevent unwanted disengagement of the mobile communicator therefrom. The POS terminals do not provide inventory management in conjunction with point of sale transaction capability throughout a retailer establishment. Furthermore, the terminals are specifically constructed to receive and house a phone device such as that commonly sold under the trade name iPhone. Consequently, the terminals are limited in structure and function to use with narrowly tailored constructs. What is more, the terminals provide for a magnetic card swiping device integrated within the terminal body itself, and as a result the phone device must be mounted within the particular terminal to carry out the point of sale transaction.

U.S. Pat. No. 5,324,922 to Roberts discloses an apparatus for managing a transaction using a transaction terminal having a manual code reading device, such as a barcode reader, for reading a data code printed on a visual medium. A transaction program forming part of the system includes at least one page of a visual medium having a first and second sets of data codes printed thereon. The first set of data codes in printed in a prearranged sequence and comprises a predetermined sequence of program commands for carrying out all of the steps of a prearranged transaction, including a subset of program commands associated with a corresponding subset of data entry steps. The second set of data codes is printed on the same or another page of said visual medium. Each of the data codes in the second set comprises a prearranged item of transaction data for use in said data entry steps. The transaction terminal includes a computer means interfaced to the manual code reading means. This computer means includes a program storage device and a data storage device. The apparatus relates to managing transactions of the type involving home shopping, bill paying and the like, and does not relate in structure or function to mobile point of sale systems for use in retail establishments. As such, the point of sale terminal does not provide a mobile tablet device capable of being mounted on a scanner device for integration and communication for sales transactions and inventory management.

U.S. Patent Application Publication No. 20130030933 to Talach et al. discloses a payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data for use in a financial transaction, a non-NFC financial transaction communication link between the mobile communicator and the POS terminal, the non-NFC financial transaction communication link being operative to communicate non-NFC data for use in the financial transaction, and a transaction effector operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link. The payment facilitating system relates to NCF data transmission for payment at a POS terminal via NCF data programmed with a user's cell phone or smart phone device to provide payment at the checkout via the cell phone. The system does not relate in structure or function to mobile point of sale systems for use in retail establishments.

U.S. Patent Application Publication No. 20120296741 to Dykes discloses a payment system including a transaction server, a virtual wallet server (VWS), at least one point of sale device including a secure element and being operative to provide secure data communication of a purchaser wallet personal identification number (WPIN), but not purchaser payment particulars, to at least the VWS and at least one mobile communicator communicating a mobile communicator presence indicator (MCPI) but neither the purchaser WPIN nor the purchaser payment particulars to the at least one point of sale device. The payment system relates utilizing a mobile device at the register counter of a retail establishment for data transmission of payment with the mobile device. The system does not relate in structure or function to mobile point of sale systems for use in retail establishments.

U.S. Patent Application Publication No. 20120284131 to Soffer et al. discloses a mobile commerce system including a multiplicity of Mobile Device—Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions. The mobile commerce system is structured having a multiplicity of Mobile Device—Point of Sale Communication (MPC) wallet-equipped mobile devices, typically smart phones such as mobile communicators operating on an ANDROID® (Google), iOS® (Apple), BLACKBERRY® or WINDOWS MOBILE® (Microsoft) operating system, and a plurality of MPC-enabled point of sale (POS) devices, for example, an electronic cash register (ECR), connected to a Near Field Communication (NFC)-enabled payment terminal. The mobile commerce system does not provide a system having a barcode scanner device integrated and in communication with a mobile tablet with payment card receiving capability. The system does not relate in structure or function to mobile point of sale systems for use in retail establishments.

U.S. Patent Application Publication No. 20120072350 to Goldthwaite et al. discloses a system processes a request by a customer to pay a transaction amount, using the customer's account, for a transaction between the customer and a merchant, to provide a payment to an account of the merchant. The transaction incorporates use of a mobile wireless device operated by the customer to provide identification information of the customer's account to an authentication server. A payment server coupled to the authentication server and the merchant passes merchant communications to the authentication server. The authentication server receives the transaction amount from the merchant and receives customer account information from the customer's wireless mobile device, and processes the transaction and account information and, if authenticated, routes the payment transaction to the payment server for payment to the merchant's account. The system relates utilizing a mobile device at the register counter of a retail establishment for data transmission of payment with the mobile device. The system does not relate in structure or function to mobile point of sale systems for use in retail establishments.

Non-patent literature entitled "PAYware Mobile Enterprise" found at http://www.verifone.com/products/hardware/mobile/payware-mobile-enterprise discloses a mobile payment solution that transforms smartphones and tablets into secure transaction portals. The literature teaches swiping, inserting or tapping a card, to execute payments. In addition, advanced features such as a 2D barcode imager, integrated PIN pad and customizable app integration are provided for merchants who want their store associates to get up from behind the cash register and interact with consumers anywhere in the store. The mobile payment solution does not provide use outside of the store; the devices disclosed fail to provide the ability for use throughout a retailer's establishment, including other locations and warehouses of the retailer.

Despite heretofore disclosed and utilized systems and methods, managing inventory throughout retailer establishments, nationally and internationally, has proven unreliable and difficult. POS capabilities remain separate from inventory management throughout retailer establishments and as a result both retailers and customers are tied to the physical location of the checkout work station, resulting in frustration and loss of sales.

Based on the foregoing, there exists a need for a Wi-Fi/wireless cellular "mobile scanner gun system" with a "mobile tablet device" utilizing a system and method that communicates daily inventory management such as physical inventory, cycle counting, inventory receiving, store to store transfers, return to vendor, and product re-ticketing, while at the same time providing the ability for processing POS sales transactions. Further, there is a need in the art for a system and method that is appointed to be utilized with a mobile portable barcode scanner and magnetic stripe reader (MSR) devices that can be carried by retail employees in a retail location to provide daily inventory management applications for a full combination of tasks, including physical inventory, cycle counting, inventory receiving, store to store transfers, return to vendor, product re-ticketing, as well as POS applications. Additionally, there is a need in the art for a system and method that can scan the barcode of interest of a customer, provide complete details of the product along with its selling price and taxes, as well as any physical and electronic coupons, promotions, and customer loyalty data and rewards available. Through use of such a novel system, a customer may decide to purchase the object just scanned or look at additional merchandise, and when a purchase decision is made by the customer, an employee can readily process the purchase, providing a courteous friendly sales environment wherein every employee has complete access to all the relevant information on any product of interest and their customer's loyalty data and rewards.

SUMMARY OF THE INVENTION

The subject invention is directed toward a Wi-Fi and wireless cellular mobile scanner gun system running a real-time store level inventory management suite of applications, StoreMobileRF™, connected directly to the corporate ERP system and running a POS application, StoreMS Mobile™, connected directly to the POS store systems server, for customer purchases throughout the retail store and well beyond its walls. The mobile scanner gun system comprises a main body portion extending toward a handle portion, the main body portion having a base, side walls, a front wall and a back wall constructed to form an interior cavity, wherein the front wall includes an aperture with a lens recessed therein. The front wall has a trigger member located near the base of the main body. A USB barcode scanner input device is mounted above and in front of the trigger, the scanner having two drivers, including 1) a native device driver and 2) a keyboard input driver, the barcode scanner input device being in communication with the trigger for initiating a scan of a barcode. A USB MSR input device is integrated within the upper receiver of the mobile scanner gun system and communicates with the mobile tablet device for carrying out and processing sales transactions, the MSR being end to end encrypted through to a PCI certified bank card processor. The top wall of the main body portion includes an attachment means comprising a base mount universal receiver with rotational coupling adapted to interchangeably mount and communicate through a specialized universal serial bus wiring harness with the mobile tablet device having a system integrated therein that enables store level real-time inventory management and a fully functioning POS capability for selling merchandise in a retail sales environment and global inventory management. The base mount universal receiver with rotational coupling enables the mobile tablet device to be viewed in both portrait mode and landscape mode without operational delay of the system.

The mobile scanner gun system used for transacting customer sales in a retail store through a mobile POS application further preferably comprises a previously programmed electrically erasable programmable read only memory (EEPROM) controlling all actions of the USB scanner input device and the scan gun trigger for activating a barcode scan operation of an item of interest for a customer by an employee of a retail establishment. The barcode scan operation is adapted to cause the EEPROM of the main printed circuit board (Main PCB) to communicate with the mobile tablet device, launching the application software to ready the mobile tablet device for receiving a scanned barcode. The application communicates with the corporate ERP system to obtain detailed information for daily inventory management purposes including such tasks as physical inventory, cycle counting, inventory receiving, store to store transfers, return to vendor and product re-ticketing. In operation and function, the customer purchases a product from any retail store employee having a mobile scanner gun system receiving full product details, price, electronic and physical coupons, promotions, and customer loyalty data and rewards available and charges the purchase in a friendly, efficient, informative, and very mobile atmosphere without having the need to bring the product to a central checkout station and waiting in queue to check out.

The system and method, and devices utilizing same, of the present invention provides a mobile scanner gun system with a mobile tablet device integration capability therein adapted to be carried by one or more employees in a retail environment. In turn, the mobile tablet device integration includes several free standing applications that are capable of linking the user to a central corporate ERP system and the POS store systems server, which provides a system and method that executes daily inventory management objectives and POS customer checkout transactions. Uniquely, the method and mobile tablet device provides the ability to carry out daily inventory management functions for such tasks as physical inventory, cycle counting, inventory receiving, store to store transfers, return to vendor, product re-ticketing, and to operatively identify a product by its barcode, establish price, taxes, promotions, physical and electronic coupons and customer loyalty data and rewards available and process the sale of merchandise to a customer, regardless of the location of the inventory within the retail chain. From within the POS transaction, if the inventory is unavailable in the store, the sold inventory can be transferred from the warehouse, another store or special ordered from the vendor and made available at any store for customer pickup or shipped to a customer location. In the case the inventory is unavailable, once the transaction is completed on the mobile scanner gun system, the item and quantity of the selected fulfillment location is allocated within the central corporate ERP system.

The mobile scanner gun system has a mobile tablet device attached to a pistol grip base housing and connected thereto through a base mount universal receiver with rotational coupling. The upper receiver of the mobile scanner gun system has a USB MSR input device mounted on one edge of the mobile tablet device and the barcode scanner is incorporated within the pistol grip base, the scanner being operable by pressing a trigger provided in the mobile scanner gun.

The mobile tablet device is encased in a hardened case/shell designed to protect the device against drops and damage. The mobile tablet device includes software readable from the subject system and method and includes several mobile applications selected for operation through the touch of an application icon. The mobile scanner gun system mobile applications have functionality to communicate wirelessly with a POS store systems server that is present within the store, a remote backup POS store systems server centrally located and the corporate ERP system through Wi-Fi and wireless cellular communication and secured using standard Wi-Fi Protected Access (WPA) and Wi-Fi Protected Access II (WPA2) wireless encryption methods. The application has functionality to order an EEPROM present within the Main PCB located in the mobile tablet device upper receiver to conduct various functions and this directive is sent through the specialized universal serial bus wiring harness. The communication between the USB barcode scanner and MSR and the mobile tablet device occurs back and forth, through the EEPROM, depending on the application function in operation.

The EEPROM of the Main PCB carries a programmed instruction set and works in conjunction with the mobile applications of the mobile tablet device. For example, if the barcode scan gun trigger of the device is pressed by the retail store employee according to the interest of a customer, this event is detected by the EEPROM of the Main PCB and is communicated to the mobile application within the mobile tablet device. The EEPROM interprets and parses the barcode read and formats it in a manner that is readily recognized by the mobile application. The mobile application communicates with the POS store systems server to obtain the details of the product scanned, its selling price, any physical and electronic coupons, promotions, and customer loyalty data and rewards available and the available inventory of the product chain-wide, including the warehouse. The mobile tablet device displays the entire data on the screen and the retail store employee may discuss these details to the customer allowing the customer to make a purchase decision. Optionally, the POS store systems server may suggest other similar products with enhanced functionality, reduced selling price and the like. Accordingly, the customer may view similar products and review product details to come to a purchase decision. Optionally, if the item is not available in the current store's inventory, the employee may suggest the item be shipped from the warehouse or another store within the chain.

When the customer reaches a purchase decision of a product displayed on the mobile tablet device screen, the employee of the store selects an application icon to invoke the mobile POS application. If shipping is required, the customer provides the customer name, address, contact telephone number, and email address if they are not already in the customer loyalty database. The customer provides a payment card to the retail store employee which is swiped in the MSR slot of the input device. "Payment Card" as used herein includes the proliferation of bank cards having magnetic track data, including credit cards and debit cards, retailer charge cards, gift cards, etc. The MSR track data is encrypted using industry standard Triple DES with DUKPT by the MSR reader before the data is transferred to the mobile POS application. The employee allows the customer to sign their name on the device to validate the sale and then the information received from the customer is securely transferred by wireless communication to the POS store systems server, which processes the payment card purchase by contacting the bank card processor via a PCI certified network. Upon receiving credit authorization of the purchase, the mobile tablet device of the mobile scanner gun system displays information that the purchase is complete and the employee bags the purchased merchandise and delivers it to the customer. The POS store systems server updates the corporate ERP system, adjusting the inventory on-hand of the merchandise sold, thus the update becomes visible chain-wide. The POS store systems server sends an email of the receipt to the customer's email address, which may be readily viewed in a smart phone carried by the customer. If desired, a hard copy of the receipt for the purchase is printed on a local printer within the retail establishment via the store's local network.

With this system, the customer does not have to bring the merchandise to a central check out location. The purchase operation can be conducted throughout the store and beyond its walls by a retail store employee carrying a mobile scanner gun system and has up to date information concerning product inventory of any item in their retail location or chain-wide, along with current details, physical and electronic coupons, promotions and customer loyalty data and rewards available.

The following paragraph details the elements, which collectively enable operation of the system as detailed hereinabove. The mobile tablet device of the mobile scanner gun system preferably comprises a custom-developed, industry hardened mobile tablet device utilizing a specialized universal serial bus wiring harness to communicate with USB devices such as MSRs and barcode scanners/readers. Various operating systems, such as those associated with the trade name Android (Google), iOS (Apple), and Windows (Microsoft) are contemplated. The mobile tablet device has custom programmed mobile applications on the Android platform. The mobile tablet device (upper receiver) is rotatably connected to several base housing concepts, each with a USB scanner input device integrated into the base. The rotational coupling permits changing the orientation of the mobile tablet device in the portrait mode or in the landscape mode of the mobile tablet device display screen. The upper receiver has an industry standard USB MSR input device integrated along the short edge of the mobile tablet device for easy access by the user regardless of which base housing is selected for use.

A key feature of the invention is an EEPROM that has a previously programmed instruction set present within the Main PCB. The EEPROM of the Main PCB is connected to the mobile tablet device and can process the command issued by the mobile application to instruct either the barcode scanner or the MSR to acquire required data. The EEPROM of the Main PCB organizes the data in proper format and delivers it to the mobile tablet device through the specialized universal serial bus wiring harness. Due to the use of the EEPROM, which can process barcode and payment card information, the attached mobile tablet device can perform secure distributed sales within a retail establishment. Each of the employees of the retail establishment knows instantaneously the inventory of any particular item chain-wide, the barcode of an item that is scanned along with its price as well as discounts, electronic and physical coupons, promotions, and customer loyalty data and rewards available. Thus a customer may look at several product items and ask the employee of the retail organization to know its price, details concerning the item, and any promotion that is available, including customer loyalty rewards. This provides a pleasant, informative interaction between the customer and the employee of the retail organization, establishing one-on-one, face-to-face relationship, which is appreciated by the customer and results in an improved sales environment.

In its preferred embodiment, the mobile scanner gun system of the present invention comprises:

i) a mobile tablet device having Wi-Fi and wireless cellular communicative capability with the corporate ERP system and the POS store systems server, attached to a pistol grip base housing through a base mount universal receiver with rotational coupling, forming a mobile scanner gun system carried by an employee in a retail store;

ii) said mobile tablet device having application software capable of commanding an EEPROM present on the Main PCB to acquire barcode scan or obtain payment card information from a swiped payment card;

iii) said USB barcode scanner input device having a gun trigger for activating a scan operation by an employee of a retail establishment, at which point the EEPROM of the Main PCB communicates with said mobile tablet device, launching said application software to get the mobile tablet device ready for received barcode;

iv) said mobile tablet device having an MSR for processing customer payment card data by an employee of a retail establishment, at which point the EEPROM of the mobile tablet device communicates with the store systems server to process customer payment card data through the proper secured bank card processor via a PCI certified network through the POS store systems server;

v) said mobile POS application software communicating with said POS store systems server and corporate ERP system to obtain detailed information of the product scanned, its inventory, selling price, electronic and physical coupons, promotions, and customer loyalty data and rewards available;

vi) said employee of the retail establishment communicating to a customer the description, price, electronic and physical coupons, promotion data, and customer loyalty data and rewards of each item scanned;

vii) said customer deciding to purchase the item and the employee accessing a POS transaction routine of said mobile POS application software, entering customer name, address and e-mail address if needed, and swiping customer data, and said EEPROM communicating formatted customer data securely to said POS store systems server;

viii) said POS store systems server contacting a bank card processor for authorization of said purchase and communicating to the mobile tablet device that the customer has purchased the scanned merchandise;

ix) said POS store systems server communicates with the corporate ERP system to adjust said product inventory becoming visible chain-wide, send a receipt to the e-mail address of the customer and/or print a hard copy of the transaction on a store network printer;

x) said mobile tablet device being operative, in the event that said authorization is denied, to inform the employee of this credit denial, so that said customer is informed, and can provide alternative payment;

whereby the customer purchases a product from any retail store employee having a mobile scanner gun system receiving full product details, price, electronic or physical coupons, promotions and customer loyalty data and rewards and tenders the transaction in a friendly atmosphere without having any need to bring the product to a central checkout station and waiting in queue to check out.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1b is a top-side of the embodiment of FIG. 1a;

FIG. 9b illustrates a bottom view of the embodiment of the frame/casing around a mobile tablet device of FIG. 9a;

FIG. 16 is a schematic diagram illustrating an embodiment of the Main PCB circuit of the mobile scanner gun system;

FIG. 18b illustrates a back short side view of the device of FIG. 18a;

FIG. 18c illustrates a bottom view of the mobile tablet device of FIG. 18a;

FIG. 18d illustrates a side view of the mobile tablet device of FIG. 18a;

FIG. 19b illustrates a top back-side view of the mobile tablet device of FIG. 19a;

FIG. 19c illustrates a top back plane view of the mobile tablet device of FIG. 19a;

FIG. 19d illustrates a top front-side view of the mobile tablet device of FIG. 19a;

FIG. 20b illustrates a top back-side view of the mobile tablet device of FIG. 20a;

FIG. 20c illustrates a top back plane view of the mobile tablet device of FIG. 20a;

FIG. 20d illustrates a top front-side view of the mobile tablet device of FIG. 20a;

FIG. 20e illustrates a side view of the mobile tablet device of FIG. 20a;

FIG. 20f illustrates a front view of the mobile tablet device of FIG. 20a; and

FIG. 20g illustrates a back underside view of the mobile tablet device of FIG. 20a.

DETAILED DESCRIPTION OF THE INVENTION

Figure 1A:
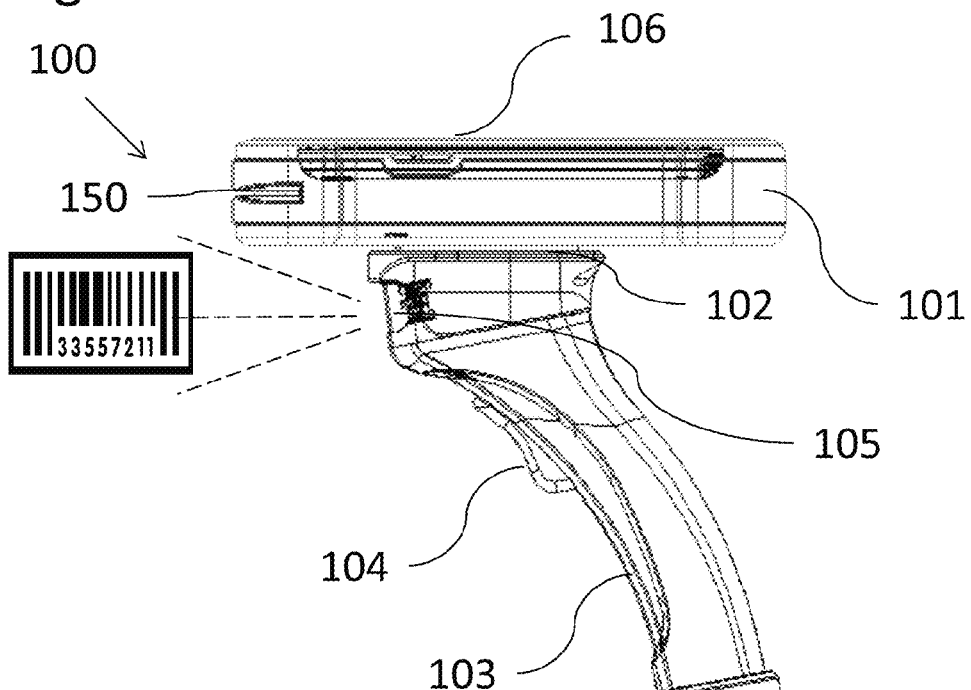
FIG. 1a is a side-view drawing of an embodiment of the mobile scanner gun system docked through a base mount universal receiver with rotational coupling to a mobile tablet device operating in concert under the enterprise resource planning mobile application's environment.

This invention is directed towards a mobile scanner gun system adapted to interchangeably receive and communicate with a mobile device, particularly a mobile tablet device, having a system integrated therein that enables store level real-time inventory management and a fully functioning POS capability for selling merchandise in a retail sales environment at any of a retailer's global locations. The mobile device, including mobile tablet device, has a display attached and is mounted to a pistol grip base housing through a base mount universal receiver with rotational coupling. The system comprises a mobile tablet device (upper receiver) having a display with the enterprise resource planning mobile application system software downloaded, which has an industry standard USB MSR input device integrated along the short edge of the mobile tablet device for easy access by the user regardless of which base housing is selected for use, in communication with several base housing concepts, each with a USB scanner input device integrated into the base through the specialized universal serial bus wiring harness. The system operates with the mobile scanner gun system and mobile tablet device thereon.

The mobile device, specifically mobile tablet device, is removably mounted on the mobile scanner gun system through a base mount universal receiver with rotational coupling and specialized universal serial bus wiring harness. The mobile tablet device is capable of being removed from the mobile scanner gun system and attached to other mobile base housing systems and docked on a fixed POS workstation and are constructed and programmed to operate under the same or interpretable operating system using the same mobile software applications. The mobile tablet device is preferably mounted through a base mount universal receiver with rotational coupling means that includes a sliding mechanism, wherein the mobile table slides onto the mount on the mobile scanner gun system. Most preferably, the base mount universal receiver with rotational coupling means that the mobile table can be readily rotated on the base from a vertical position (hereinafter, "portrait mode") to a horizontal position (hereinafter, "landscape mode") via 90 degree rotation on the horizontal plane. Conversion from portrait mode to landscape mode is achieved easily through the rotating member without operational delay of the system, and does not require disconnection from the system. The mobile tablet device frame can rotate 90 degrees either left or right from its "home" portrait position to its landscape position. Landscape and portrait "view" rotation of the mobile tablet device and mobile scanner gun system can be software locked based on current active position selected by the user.

Whether the specially constructed frame is utilized or the mobile tablet device is specially designed, the mobile tablet device is housed or integrated within a rubberized frame that encases the mobile tablet device body aside from the top touch screen. The rubberized frame is most preferably smooth and rugged to protect the mobile tablet device in a hostile store operation and provide optimal wear and usage as it is appointed to be used throughout the day on a sales floor. Further, a wrist lanyard is preferably connected at the base of the mobile scanner gun system to avoid unnecessary drops that could otherwise damage the mobile scanner gun system or the mobile tablet device.

The mobile tablet device is preferably measures about 2 inches to 10.5 inches diagonally, preferably 4 inches to 7 inches, and most preferably 5 inches to about 5.5 inches diagonally. A specially designed and constructed mobile tablet device having specific mounting capability and durability features is preferably utilized with the mobile tablet device and system thereof. Though currently offered consumer grade mobile tablets are contemplated as well, however, the consumer grade tablets would require insertion within a specially constructed case or unit to enable mounting upon the mobile scanner gun system. The optionally constructed case includes a mounting slide adapted to mate with the base mount universal receiver with rotational coupling mechanism of the mobile scanner gun system. The case is constructed as a rubberized frame that removably receives and houses the mobile tablet device. In turn, download and integration of the operational system and mobile software applications would be required for operation of the subject system of the mobile scanner gun system.

A pistol handle construction is most preferred in the structure of the mobile scanner gun system for ergonomics, comfort and optimal handling of the mobile scanner gun system as it is adapted to be mobile throughout the store environment and thusly carried for long periods of time by an employee. Further, the pistol handle structure enables secure carrying of the device throughout the day inasmuch as the device is generally appointed to be carried by the employee or sales associate through the retailer's operation hours, as well as during inventory and stocking events during non-operational hours. The scan gun trigger in turn, is preferably constructed as a pistol trigger design to further facilitate the functional requirements of the device's use in the retail environment for long hours and wear.

Further paramount to the intended functional long-term usages of the mobile scanner gun system is an extended battery life. Accordingly, the mobile scanner gun system preferably includes a battery system utilizing a battery that preferably resides within the upper receiver of the mobile tablet device. The mobile scanner gun system includes a micro USB connector on the bottom of the upper receiver for charging the primary mobile tablet device and the secondary battery located within the upper receiver housing of the mobile scanner gun system.

The mobile scanner gun system includes a mobile tablet device upper receiver that has a specialized universal serial bus wiring harness which supports several USB device interfaces, such as mini USB and micro USB as are standard in consumer grade tablet industry. The upper receiver of the mobile scanner gun system is removable to allow the upper receiver to be mounted onto any of four base housing systems through its base mount universal receiver with rotational coupling. The construction of the mobile scanner gun system must be hardened plastic for durability and long usage hours. Additionally, the base mount universal receiver and rotational coupling connecting the mobile scanner gun system pistol grip base housing to the upper receiver is durable/industry hardened.

Fixed and integrated to the mobile scanner gun system pistol grip base housing, mounted directly above and in front of the trigger, is a USB scanner input device. The scanner has two drivers, including 1) a native device driver and 2) a keyboard input driver. Fixed and integrated along the short edge of the upper receiver of the mobile tablet device and above the scanner, is a USB MSR input device for use in carrying out POS sales transactions requiring a customer payment card. The MSR is networked with a certified bank card processor and all POS transactions are End to End Encrypted for PCI compliance requirements. Additionally, preferably the mobile tablet device is software secured through third party security software and rendered useless outside the retail enterprise as a theft deterrent. Preferably, an RFID tag is imbedded in the Tablet Gun™ to sound an alarm if stolen.

The overall structure of the mobile scanner gun system is to make it look and feel "integrated" with the mobile tablet device and not as separate pieces and parts. Even though the mobile tablet device can be replaced and upgraded, the device has the look and feel of one tightly integrated device. Smooth edges and integrated design are utilized in the structure for comfort and durability. The entire system results in a rugged and tight system and structure, without looking like it is a "pieced together" device.

This invention relates to real-time daily store level inventory management and a fully functioning POS system for customer sales transactions of merchandise in a retail sales environment. The system comprises a mobile scanner gun system that has a mobile tablet device attached through a base mount universal receiver with rotational coupling adapted to permit changing the orientation of the tablet device in portrait mode or landscape mode.

The system and method of the present invention provides technology that empowers sales associates to service their customers without consideration to the physical location of the product. Through use of the subject system and methods, goods can be purchased anywhere, anytime and delivered wherever and whenever the consumer wants it. Under current systems and methods, the consumer must travel to the location of the good (or order the good on-line through their personal device and wait for delivery or in store pick-up). This adds an inconvenient step—that is rather than allowing the sales associate to simply handle the purchase via a mobile POS device and have the item delivered where the customer wants, the customer must drive to the other location or place his/her own order through his/her own means. Not only is this inconvenient, but such inconvenience often results in the loss of the sale altogether, as the customer may decide to forego the purchase, or simply move on to the competitor's store if it is nearby and convenient to do so.

None of the heretofore systems and methods provide the ability for a retailer to utilize software and hardware that runs the entire store, ranging from real-time inventory management, to POS transactions. The system, method and devices herein provide this unique advantageous feature. The subject system and method, and devices implementing same, provide the following advantages: 1) increased store productivity, 2) reduced technology cost and footprint, and 3) improved customer satisfaction, all of which in turn ensures return on investment (ROI).

ERP systems integrate internal and external management information throughout an organization, embracing finance/accounting, manufacturing, sales and service, customer relationship management, etc. ERP systems automate this activity with an integrated software application. The purpose of ERP is to facilitate the flow of information between all business functions inside the boundaries of the organization and manage the connections to outside stakeholders. ERP systems can run on a variety of computer hardware and network configurations, typically employing a database as a repository for information. Examples of vendors who build industry leading ERP systems include: JDA Software Group, Oracle, SAP, Epicor, etc. However, present systems do not provide the ability for a store employee at a physical store location to have direct mobile access to real-time inventory management and POS capability.

The subject system and methods provides real-time store level inventory management and mobile POS customer check-out to retail establishments that complement current merchandising systems generally utilized by chain retailers. Real-time mobile inventory management functionality is provided by the subject system and methods, preferably built around the JDA Merchandise Management System (MMS) environment, leveraging current legacy store systems and accessing the current MMS iSeries environment. Through use of the subject system MMS iSeries environment, businesses can build their own cloud to provide mobile customer check-out/order fulfillment and daily real-time inventory management in the store through the mobile scanner gun system.

Uniquely, the subject system and method provides the ability to use a mobile tablet device in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction. Implementation of the subject system and methods, and devices thereon implemented provides strong inventory management, and leveraging current technology infrastructure ensures ROI.

Advantageously, the subject system, method and devices of the present invention allow a sales associate using a mobile scanner device system anywhere in the store and physically beyond the store, to carry out inventory management tasks such as: a) Daily Cycle Counting & Physical Inventory, b) Receiving & Returns, c) Store Transfers, d) Item Checking, e) Re-Ticketing, etc. Such tasks are performed real time within the ERP system and are all visible chain-wide. Further, the sales associate can run mobile POS throughout the sales floor and beyond the stores physical walls, with all the capability previously contained at the POS cash wrap's fixed location. Through use of the subject system and method, a sales associate can perform the following from a mobile scanner gun system: i) sell "out of stock" product available in the warehouse, another store or from a vendor; ii) create a purchase order (PO) or transfer within MMS and track that item transfer on the web; iii) sell products from their e-commerce site; iv) combat "Showrooming" by providing customers real-time competitive product and pricing information, allowing staff to match prices and satisfy their customer's demands by exceeding expectations at the point of purchase.

Mobile POS represents the future of retail technology in chain retail. For decades retail stores have been designed around fixed cash-wrap POS stations/register stations. New studies indicate that cash-wrap POS stations/register stations are becoming less relevant in future retail markets. Approximately one fifth (21.4%) of retailers are planning on removing or decreasing use of traditional fixed-station POS/register stations per store. Mobile POS will eventually replace these systems. As mobile devices mature and harden the need for POS register stations, terminals and smart RF scan guns with cryptic processes will continue to dwindle.

However, today's enterprise mobile devices fall short; although many are durable and retail hardened, and work well for inventory, they are ineffective on sales floor due to lack of functionality and usability. Moreover, conventional enterprise mobile devices are very expensive and locked into outdated technology. Although consumer devices appear to have some potential to fill this gap, these devices lack durability, hardware integration, and retail specific software and functionality.

The system and method of the present invention provides implementation within a mobile scanner gun system that performs all the necessary real-time store level inventory management functions and utilize the Internet to provide competitive analysis, thus determining product pricing for the customer and transacting the sale accordingly. The mobile scanner gun system is totally mobile throughout the store and beyond its walls and does not compromise work-flow or require extensive training to use. The system, method, and devices of the present invention 1) match the exceptional "work flow" performance of legacy radio frequency (RF) data terminal for inventory management, 2) match the transaction speed of the POS terminal found in a high volume retail store, 3) are Payment Card Industry (PCI) compliant, since security is a necessary prerequisite in today's retail environment, and 4) are durable, since the store environment will challenge practically any piece of hardware.

An advantageous feature of the mobile scanner gun system and mobile tablet device of the invention is the simplicity of their design, which ensures that the final product is both richly functional and cost effective. The mobile tablet device (upper receiver) is removable from the mobile scanner gun system, is readily docked in other types of base scanner housing platforms, and is additionally capable of being docked in a fixed POS cash-wrap station. By using standard industry components such as industry standard USB MSR heads and barcode scanner components in conjunction with a preferably customized mobile tablet device, the mobile scanner system with mobile tablet device integration capability therein will provide all the standard features of a typical consumer grade tablet, coupled with retail industry hardened components integrated into an industry hardened frame—built for industrial use—with an "easy to use" scan gun model, wearable model, hand held model and fixed workstation model and with the subject system and method readable therein. The functional specification of the mobile tablet device is a mini tablet that preferably measures about 2 inches to 10.5 inches diagonally, preferably 4 inches to 7 inches, and most preferably 5 inches to about 5.5 inches diagonally. The handle of the mobile scanner gun system is preferably coated with rubber for comfort and/or is enclosed within a comfort grip rubber covering and the trigger is ergonomically designed to be more like a pistol. Rotation from portrait mode to landscape mode of the mobile tablet device is achieved with compression tubes—as compression springs roll in and out via a rotating dial—the upper receiver rotates smoothly but stays in place through each fixed position. The mobile tablet device slides on and off from the mobile scanner gun system through communication of a button on one side of the mobile tablet device, sliding on and off via a groove slide. The USB input devices, including the scanner and MSR, of the mobile scanner gun system are powered by a rechargeable lithium ion battery, as well as a backup battery of equal size that extends battery life for a period of time that is necessary to assure uninterrupted operation on the sales floor.

A specialized universal serial bus wiring harness is used for charging the lithium ion battery system. Portability of the mobile scanner gun system's upper receiver for the system and method mobile tablet device implementation provides four base housing concepts. The mobile scanner gun system's upper receiver with integrated mobile tablet device and MSR is consistent for three of the four base housing concepts: 1) The mobile scanner gun system 2) The wearable mobile scanner system 3) The fixed docked workstation. The fourth base housing concept is the handheld housing and requires the scanner to be mounted integrally into the upper receiver along with the mobile tablet device and the MSR. Portability makes the system's tablet upper receiver even more valuable.

Generally stated, the present invention comprises a system and method for use with a mobile scanner gun system associated with an integration capable mobile tablet device. This system, method, mobile scanner gun system and integration capable mobile tablet device is used by an employee on a sales floor of a retail establishment for both daily inventory management purposes for such tasks as physical inventory, cycle counting, inventory receiving, store to store transfers, return to vendor, product re-ticketing and to operatively identify a product by its barcode, establish price, promotions, physical and electronic coupons and customer loyalty data and rewards available and process sale of product to a customer regardless of the location of the inventory. The sold inventory can be transferred to any store for customer pickup or shipped to a customer location from the mobile scanner gun system. Once the transaction is completed on the mobile scanner gun system, the sold merchandise is allocated and systemically visible within the ERP system chain-wide. With this system, the customer does not have to bring the merchandise to a central check out location. In conventional systems, the checkout procedure is typically carried out without the customer having adequate knowledge of the product, or comparing its features, price or the like with other competing products. Through use of the system and method implemented for use with a mobile scanner gun system and integration capable mobile tablet device, an employee of a retailer can sell merchandise from any store—not only from within the particular store's inventory, but within any store or warehouse chain wide. The mobile scanner gun system reads the barcode of a particular item that is available for purchase, and retrieves a plethora of product details from the POS store systems server, using wireless communication. Such details may include current pricing, electronic or physical coupons, promotions, and customer loyalty data and rewards available, so that the retail sales employee on the floor can communicate the pricing structure to a potential customer anywhere on the sales floor. If the customer decides to purchase the item, the name of the customer as well as the customer's e-mail address is recorded if they are not already in the customer loyalty database, and the payment card of the customer is swiped through the MSR on the mobile scanner gun system. The appropriate encrypted payment card information is wirelessly transmitted via an encrypted communication to the POS store systems server within the store and onto a certified bank card authorization processor, whereby the encrypted authorization is returned to the POS store systems server and subsequently onto the mobile tablet gun system. Unless credit is denied, the purchase is authorized and the customer is given the purchased merchandise. The receipt for this purchase can be printed on the store network and/or sent by e-mail to the customer. The POS store systems server transmits the transaction details to the corporate ERP system for adjustment of inventory of merchandise that has been sold and those updates are available real-time chain-wide.

The mobile tablet device of the mobile scanner gun system preferably comprises a custom-developed, industry hardened device utilizing a specialized universal serial bus wiring harness to communicate with the USB input devices such as a barcode scanner and an MSR. Various operating systems, such as those associated with the trade name Android, iOS, and Windows are contemplated.

The mobile tablet device (upper receiver) is connected by a base mount universal receiver with rotational coupling adapted to permit changing the orientation of the tablet device in portrait mode or landscape mode of the tablet display screen and communicate through a specialized universal serial bus wiring harness with a barcode scanner input device having a system integrated therein, which is placed directly below the mobile tablet device in the scan gun model, integrated into the upper receiver in the hand held model, integrated into the back of the forehand in the wearable model, and fixed within the stand frame of the workstation model. There are a minimum of two standard USB input devices with others contemplated: A barcode scanner and an MSR. The MSR is positioned on the short edge of the mobile tablet device directly above the scanner in the scan gun model, which is forward facing on the base of the gun in front of the trigger. The scanner is connected to the mobile tablet device using a specialized universal serial bus wiring harness. The mobile tablet device has custom programmed applications in the IOS, Android and Windows platforms. Other USB input devices contemplated are a variety of mobile chip and pin payment card readers that would replace the MSR on the mobile scanner gun system upper receiver or connected remotely using Blue Tooth technology for communication between the mobile tablet device and the mobile chip and pin payment card reader.

Figure 1B:
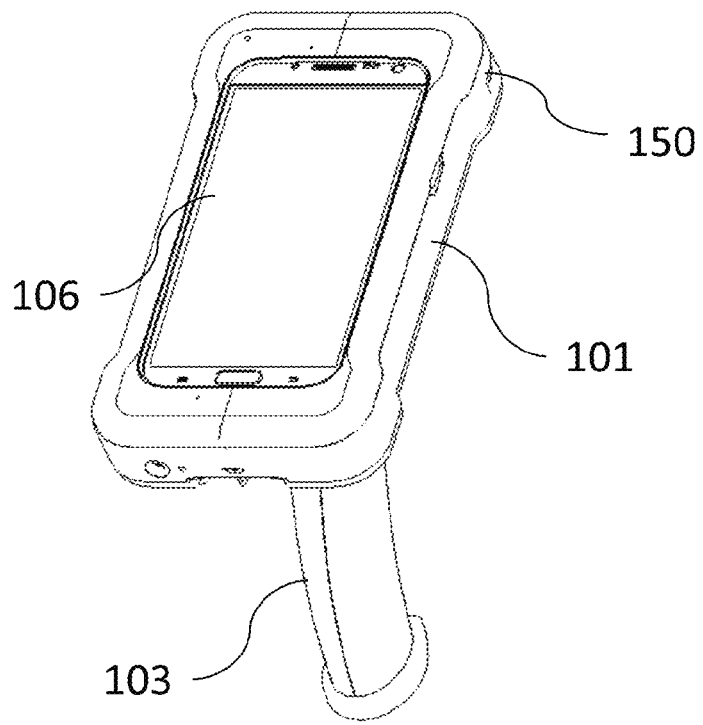

FIGS. 1a and 1b illustrate a first embodiment of the subject mobile scanner gun system with integration of a mobile tablet device operational with the system and method, shown generally at 100. FIG. 1a shows a side-view while FIG. 1b shows a top-side view of the device. The mobile scanner gun system is shown generally at 100 in FIGS. 1a and 1b. Referring to FIGS. 1a and 1b, the mobile scanner gun system 100 has a mobile tablet device 101 attached to the pistol grip base housing through the base mount universal receiver with rotational coupling 102, having a rotatable element that permits the alignment of the mobile tablet device in the portrait or landscape mode. The figure shows the mobile tablet device in the portrait mode. A plurality of applications is present in the mobile tablet device display screen 106. The pistol grip base housing has a gun handle 103 with a trigger 104, which turns on the barcode scanner 105. Illumination from the barcode scanner is shown in FIG. 1. Preferably, an MSR slot 150 for carrying-out payment card transactions is present on the short edge of the mobile tablet device 101. In landscape mode, the MSR 150 is perpendicular to the scanner; in portrait mode, the MSR 150 is parallel to the scanner as shown in FIG. 1a. The base mount universal receiver with rotational coupling 102 is connected to the mobile tablet device through a slide groove mechanism 101 and is also not visible in this figure since it is incorporated within the rotatable connection between the mobile tablet device and the base mount universal receiver with rotational coupling (see Figures hereinafter).

There are a number of specifically designed programmed applications that allow the mobile tablet device to command the USB input devices, such as the barcode scanner and MSR, through the specialized universal serial bus wiring harness to perform various functions typical to scanner operations and MSR operations. Running of the specially programmed mobile POS application, StoreMS Mobile™ is initiated and a command is sent to the EEPROM to acquire a barcode scan. The mobile tablet device in this mode is ready to receive the barcode data from the scanner and communicates with the POS store systems server at the retail facility to obtain specific product information such as, product availability within the store and chain, price, promotions, physical and electronic coupons and customer loyalty data and rewards available. The employee of the retail organization presents the data that is related to the particular item of interest to the customer. When the customer decides to purchase the particular item scanned, the employee of the retail organization uses the mobile POS application to process the sales transaction, if needed for shipping, pertinent customer information is taken or their records are updated if they are already a loyalty rewards customer. At tender, the POS application can open the cash drawer wirelessly for cash transactions and also launch a request for processing the sale using a customer payment card. The customer's payment card is swiped via the MSR, which is located on the short edge of the upper receiver. All pertinent payment card data is encrypted by the MSR and the EEPROM communicates the encrypted data through the specialized universal serial bus wiring harness to the mobile tablet device.

The mobile POS application, StoreMS Mobile™, present in the mobile tablet device communicates all pertinent customer payment card data, using a PCI compliant encrypted wireless connection, to the POS store systems server. The POS store systems server contacts a PCI certified bank card processor to obtain authorization for the purchase. If the purchase is authorized, this information is sent to the mobile tablet device display screen for customer signature using an integrated signature capture application built within the mobile POS application on the mobile tablet device and the customer is allowed to take possession of the purchased merchandise. The POS store systems server can send a receipt for the purchase to the e-mail address and/or a hard copy of the receipt can also be printed in a central printer present in the retail establishment if desired. The POS store systems server transmits the transaction details to the corporate ERP system, updating inventory positions of sold merchandise and becoming visible chain-wide in real-time fashion. If the credit purchase is denied, the mobile tablet device displays this credit request decline. The employee of the retail organization informs the customer of this credit purchase rejection and requests another form of payment. Thus the purchase of a product by a customer is accomplished by StoreMS Mobile™ by an employee having a mobile scanner gun system anywhere in the store, or beyond the physical location of the store, without the customer having to bring the product to a sales counter and wait in line at the counter to consummate the purchase; and the inventory of any item in the retail establishment is always current and available for purchase transactions carried out by a plurality of sales personnel working with a plurality of customers at a wide variety of locations within the retail establishment.

Figure 2:
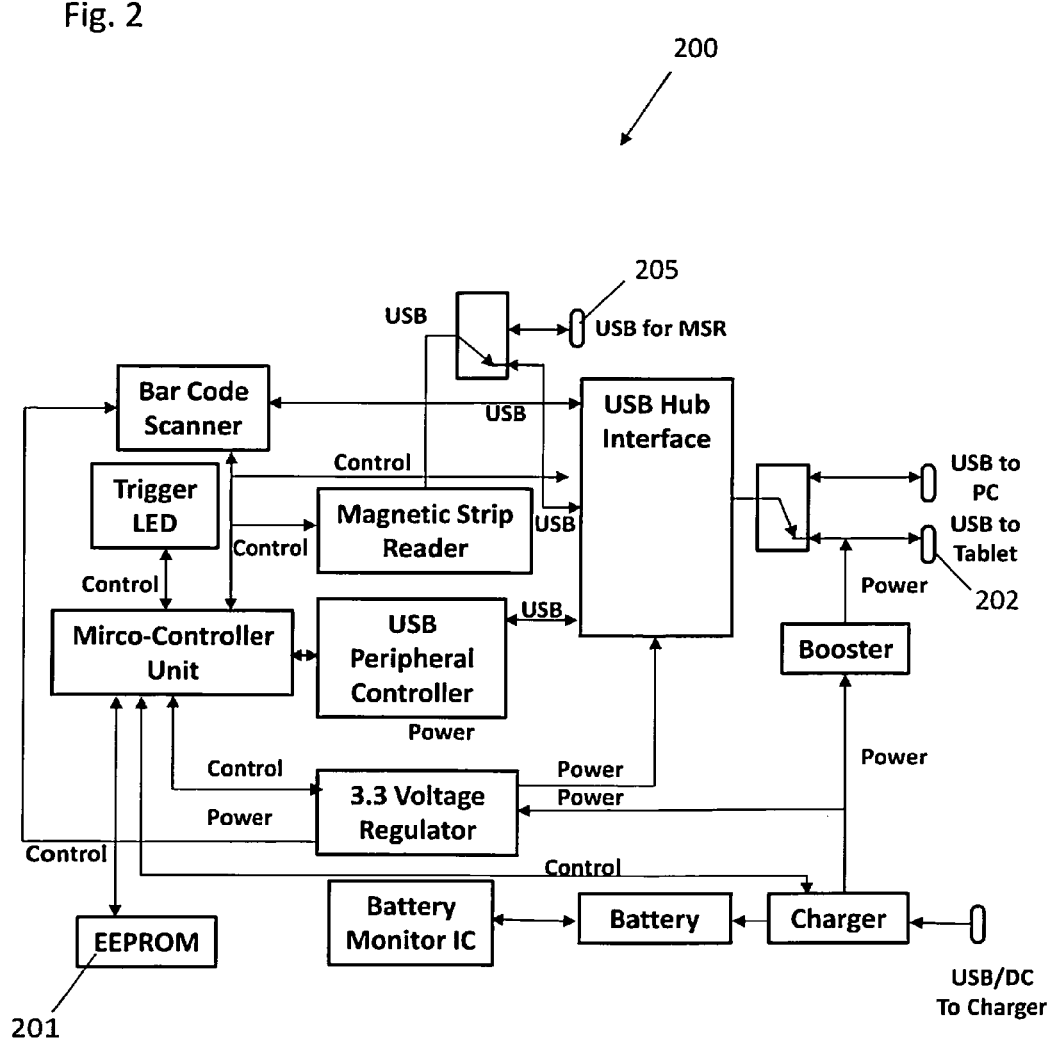
FIG. 2 is a schematic diagram illustrating the circuit of the Main PCB residing in the mobile tablet device upper receiver.

A key feature of the invention is an EEPROM that has a previously programmed instruction set present within the Main PCB. The schematic diagram of the Main PCB is shown in FIG. 2 at 200. The EEPROM is shown at 201 and is connected to the mobile tablet device at 202 and can process the command issued by the mobile applications to command either the barcode scanner or the MSR to acquire required data. The mobile tablet device has several mobile applications accessed by icons on the mobile tablet device screen and has functionality to communicate wirelessly via Wi-Fi or wireless cellular with a POS store systems server, a centrally located backup POS store systems server or directly to the corporate ERP system depending on the particular mobile application and function in use. This communication is secured using standard WPA or WPA2 wireless encryption methods; alternatively, a secondary means of communication is available through a wireless cellular module intergraded into the mobile tablet device and accessed via a data plan through a standard cellular carrier. When the payment card transaction is approved by the bank card authorization processor, the appropriate encrypted payment card information is wirelessly transmitted via an encrypted communication back to the POS store systems server within the store and onto the mobile scanner gun system, whereby the encrypted authorization is processed by the mobile POS application. Unless credit is denied, the transaction authorization is sent to the mobile tablet device display screen for customer signature using an integrated signature capture application built within the mobile POS application on the mobile tablet device and the customer is given the purchased merchandise. The receipt for this purchase can be printed on the store network and/or sent by e-mail to the customer. The POS store systems server sends a request to the ERP system to update appropriate allocated inventory for merchandise sold regardless of the fulfillment location used to complete the purchase. The ERP system processes that request and updates the corporate inventory databases, which are accessible chain-wide.

Due to the use of the EEPROM, which can process barcode and payment card information, the attached mobile tablet device can perform secure distributed sales within a retail establishment. Through StoreMS Mobile™, all store employees know instantaneously the available inventory of any particular item across the chain; any product and its particular details can be reviewed with the customer and sold regardless of the products availability in the store ringing the sale. Thus a customer may look at a variety of products and ask the sales person its price, detailed product description, as well as any physical and electronic coupons, promotions and customer loyalty data and rewards that are available. This provides a friendly, efficient and informative interaction between the customer and the retail salesperson; it establishes a one-on-one face-to-face relationship, which is appreciated by the customer and is conducive to an improved sales environment.

Figure 3:
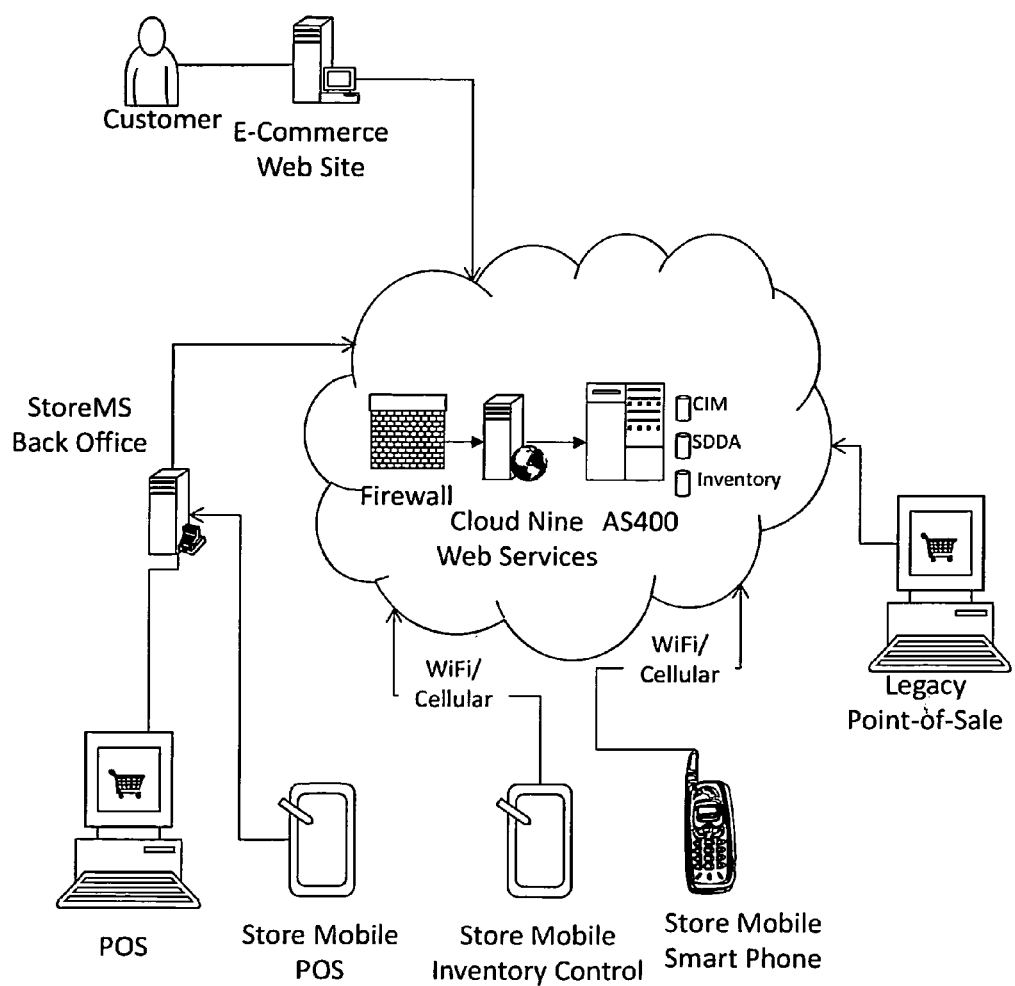
FIG. 3 is a schematic diagram illustrating an embodiment of the StoreMobile Cloud™ environment of the subject system and method.
Figure 4:
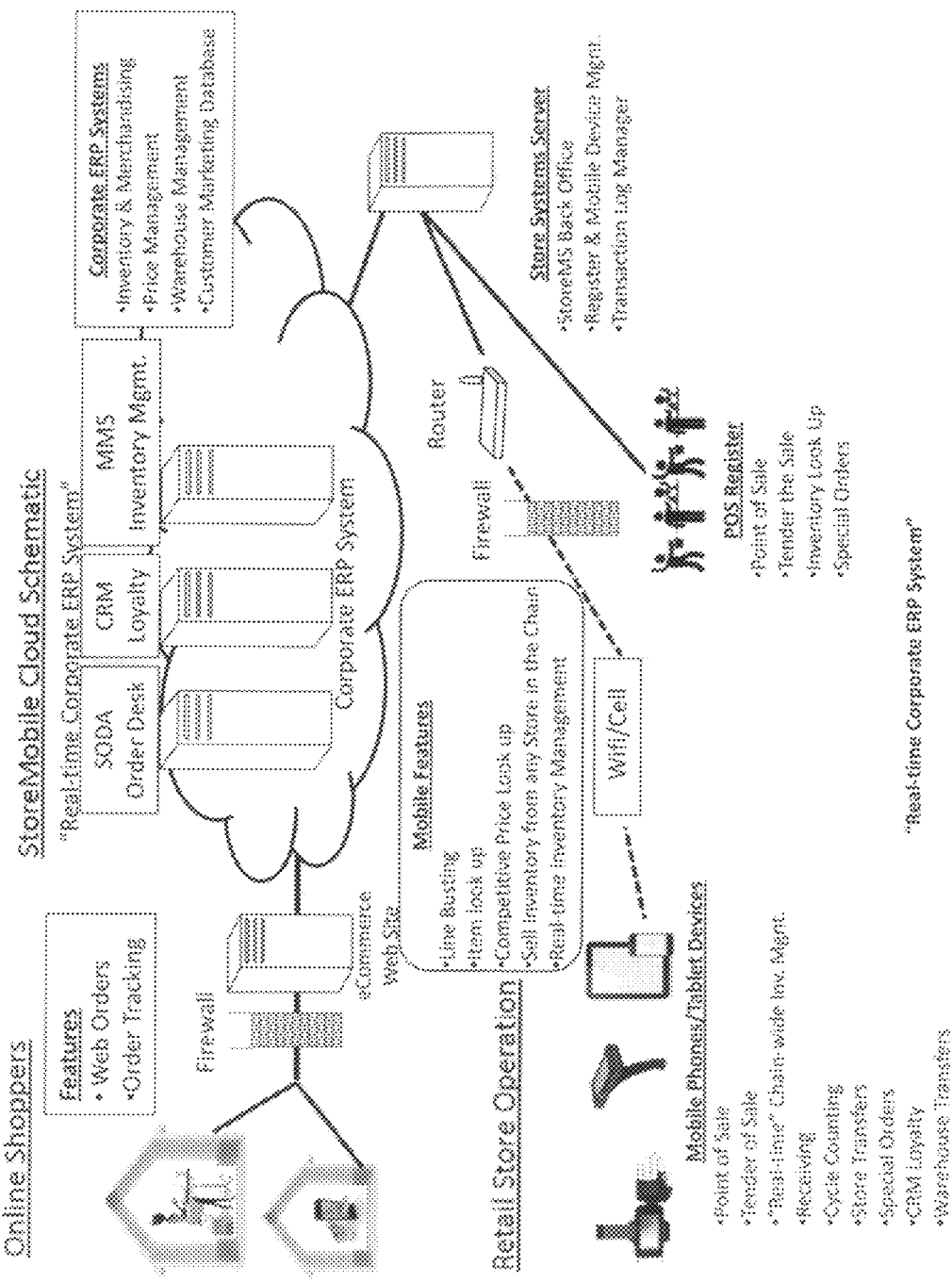
FIG. 4 is an in-depth schematic diagram illustrating an embodiment of the StoreMobile Cloud™ network schematic of the subject system and method.
Figure 5:
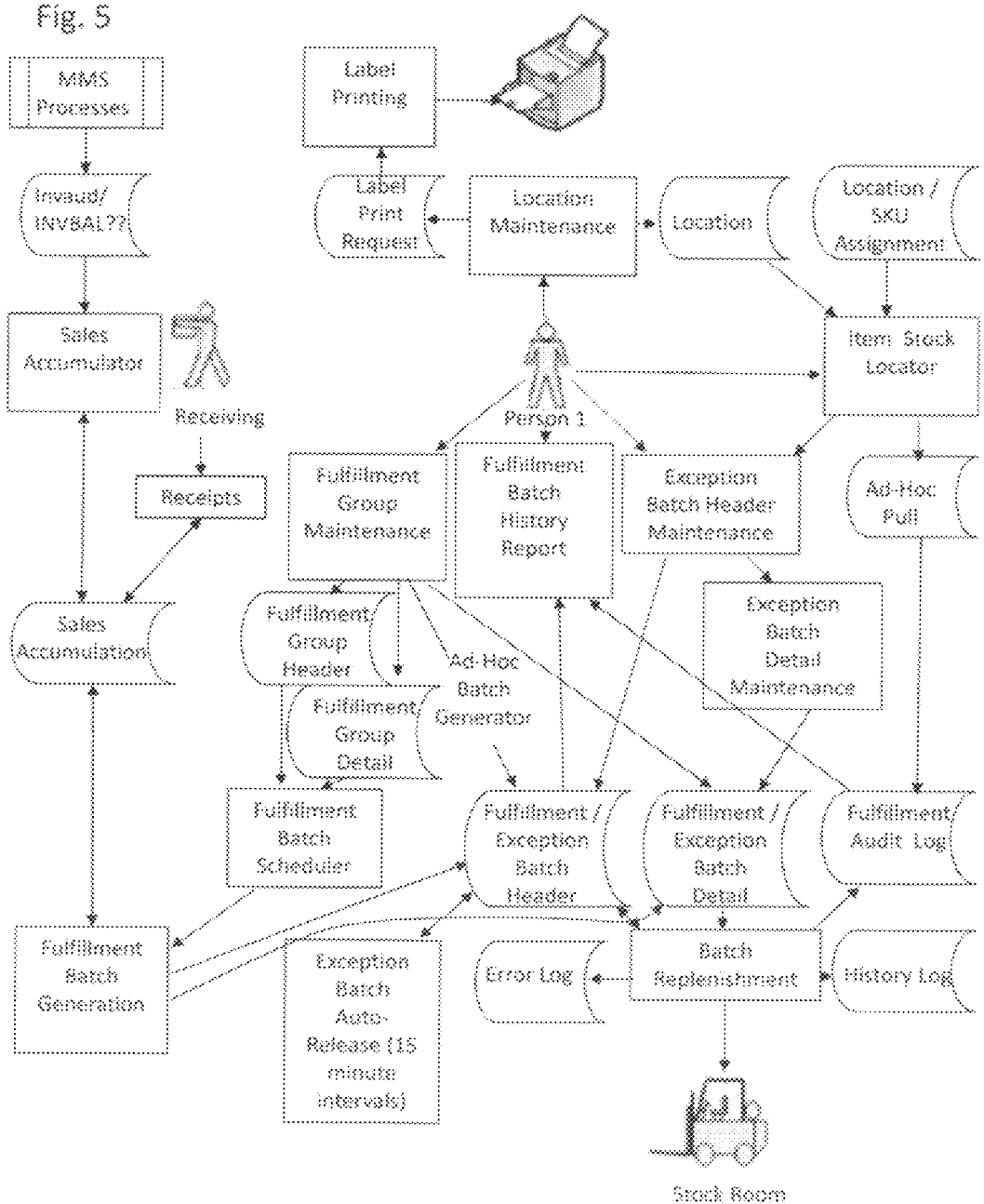
FIG. 5 is a flow chart diagram illustrating an embodiment of the back room management picture flow of the subject system and method.

FIG. 3 is a schematic diagram illustrating an embodiment of the StoreMobile Cloud™ environment of the subject system and method. FIG. 4 is an in-depth schematic diagram illustrating an embodiment of the StoreMobile Cloud™ environment of the subject system and method. FIG. 5 is a flow chart diagram illustrating an embodiment of the back room management picture flow of the subject system and method. Referring generally to FIGS. 3-5, generally a three-phased approach is implemented by the subject system and method.

In phase I of building the StoreMobile Cloud™ environment, the corporate ERP inventory management applications relating to the store are mobilized through the subject system's StoreMobileRF™, a trademark of Retail Technologies Corporation, application. As a result of the system's StoreMobileRF™ application, retailers can manage store inventory in real-time fashion, connected directly to their corporate ERP system from a mobile scanner gun system in any store.

In phase II of building the StoreMobile Cloud™ environment, POS and related store systems are fully operational so that POS customer check-out is mobilized through its StoreMS Mobile™ application. The system's StoreMS Mobile™ application works alongside the system's StoreMobileRF™. Access to the Internet, StoreMS Loyalty™, StoreMS Gift Card ™, and end to end encrypted payment card processing are standard features of the mobile scanner gun system's StoreMS Mobile™ application. Advantageously, StoreMS Mobile™ excels at "line busting", reducing overall store register count, or completely replacing all fixed POS cash wrap stations throughout the store.

In Phase III of building the StoreMobile Cloud™ environment, StoreMobileRF™ and StoreMS Mobile™ applications are both up and running together, with StoreMS Mobile™ directly accessing the POS store systems server and StoreMobileRF™ directly accesses the corporate ERP system. Additionally, StoreMS Mobile can now access the corporate ERP system for pertinent inventory availability throughout the chain and sell, transfer, and special order merchandise not available in its own store through the corporate ERP system. Further, the allocation of inventory for these special POS transactions is visible chain-wide through the StoreMobileRF™ application.

Figure 6:
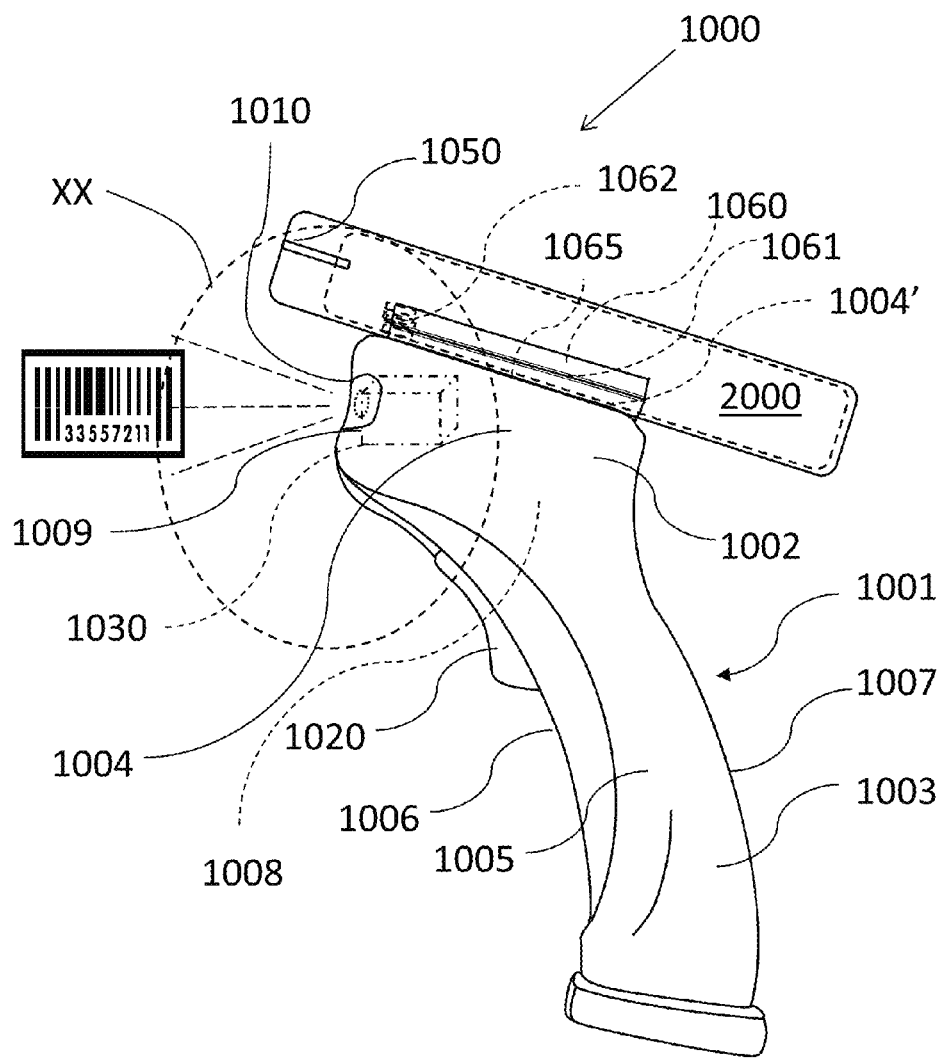
FIG. 6 illustrates a side view of an embodiment of the subject mobile scanner gun system for processing a retail store purchase.
Figure 7:
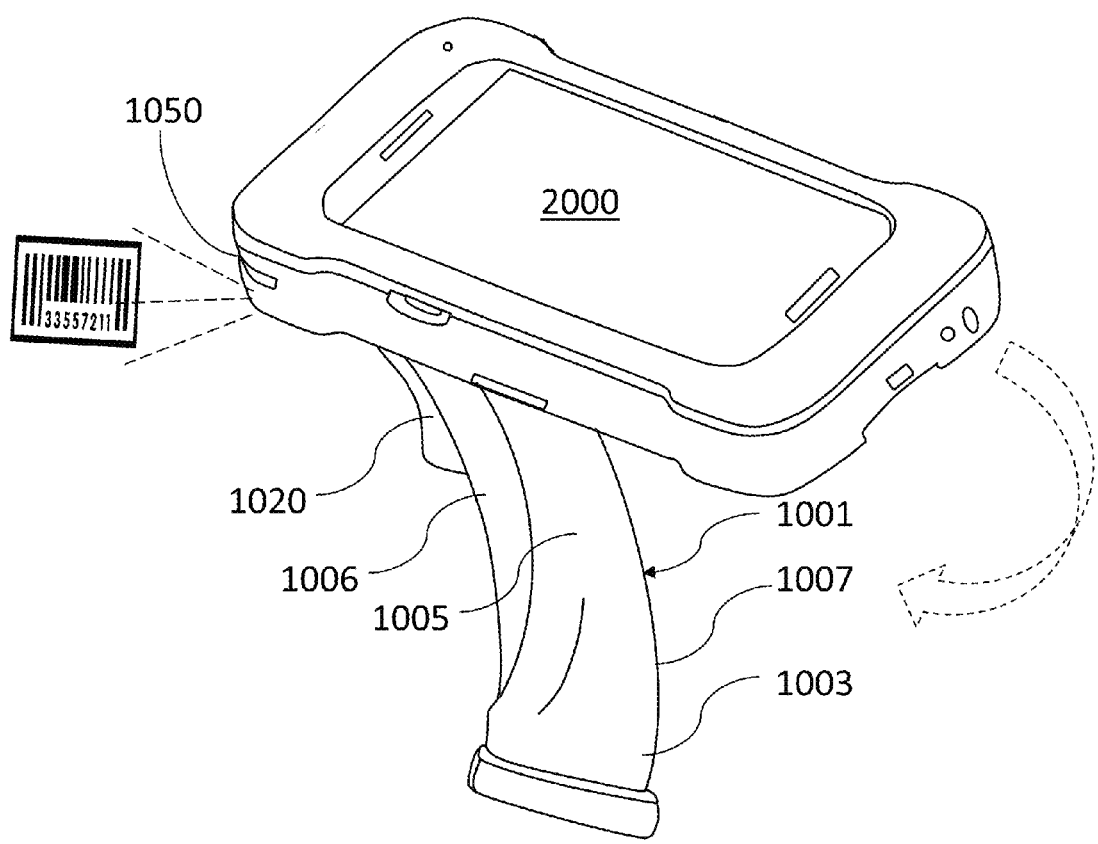
FIG. 7 illustrates a top view of the embodiment of FIG. 6.

FIG. 6 illustrates a side view of an embodiment of the subject mobile scanner gun system for processing a retail store purchase, shown generally at 1000. FIG. 7 illustrates a top view of the embodiment of FIG. 6. Referring to FIGS. 6 and 7, the mobile scanner gun system 1000 comprises a main body portion 2000 extending toward a handle portion 1001. Main body portion 2000 includes handle portion 1001, a base 1004, side walls 1005, a front wall 1006 and a back wall 1007 constructed to form an interior cavity 1008. Front wall 1006 includes an aperture 1009 with a lens 1010 recessed therein. The front wall 1006 has a trigger member 1020 located near the base 1004 of the main body. A scanner device 1030 is mounted above and in front of the trigger 1020. The scanner includes a scanner engine and has two drivers, including 1) a native device driver and 2) a keyboard input driver, the scanner device being in communication with the trigger for initiating a scan of a barcode.

An MSR device 1050 is integrated within the device for carrying out and processing customer sales transactions.

Preferably, the MSR device 1050 is located along the side of the mobile tablet device in the upper receiver directly above the scanner 1030. The MSR device is end-to-end encrypted for PCI security compliance requirements. The MSR 1050 allows for direct POS customer transaction processing anywhere wherein Wi-Fi or wireless cellular connectivity is available, thus not limited to the retail sale floor but anywhere Wi-Fi or wireless cellular service is available for inventory on the floor, locale warehouse, tent sales, or globally throughout the retailer's enterprise. A very unique feature of the subject system and device thereof is the ability to go beyond the store with the wireless cellular connectivity. Top wall 1004' of base 1004 of the main body portion includes an attachment means 1060. Attachment means 1060 comprises a base mount universal receiver with rotational coupling and specialized universal serial bus wiring harness 1062 adapted to interchangeably mount and communicate with a mobile device 2000 having a system integrated therein that enables store level real-time inventory management and a fully functioning POS capability for selling merchandise in a retail sales environment and global inventory management. The base mount universal receiver with a rotational coupling means 1061 (shown as a sliding track) includes a rotating member 1065 for conversion of the mobile tablet device from portrait mode to landscape mode without operational delay of the system. (See FIG. 15*a*-*d* for images of an embodiment of the rotating member).

Figure 8:
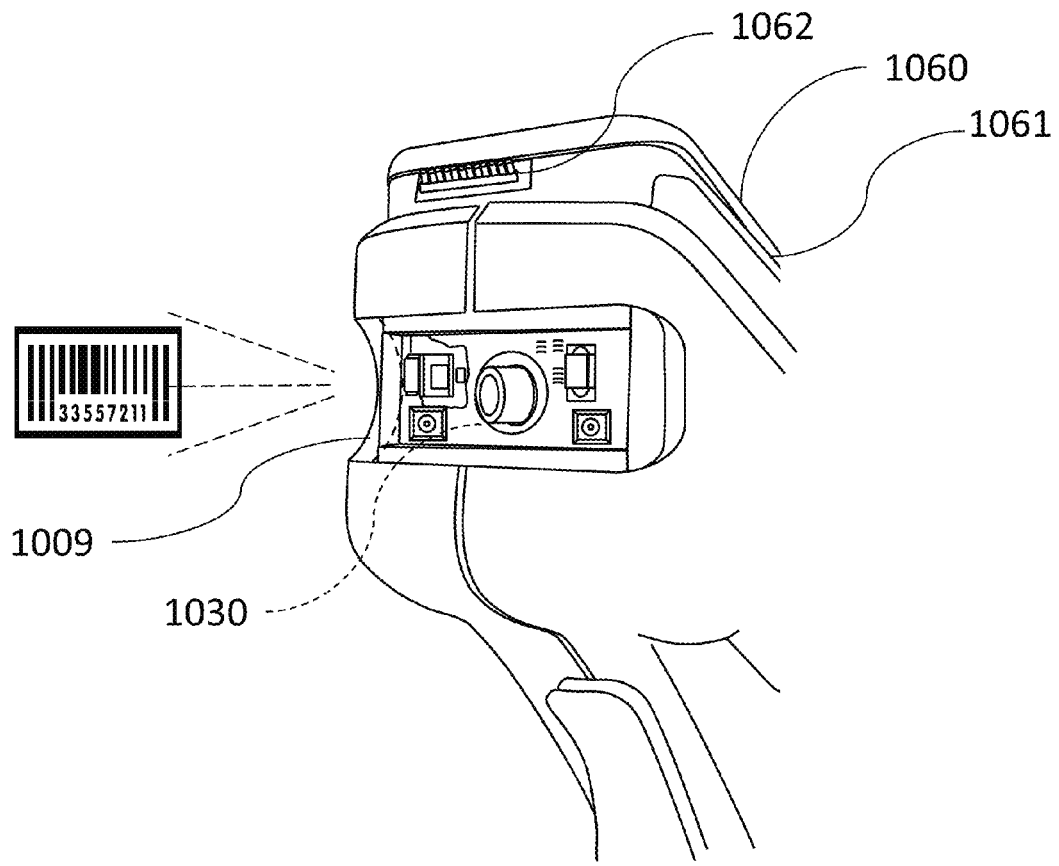
FIG. 8 illustrates a cross-sectional view taken along cut-out of FIG. 6, wherein the mobile tablet device is removed from the pistol grip base housing.

FIG. 8 illustrates a cross-sectional view taken along cut-out XX of FIG. 6, shown generally at FIG. 1*a*-105. In the illustration shown, the mobile tablet device 2000 is removed from the gun 1001 for view of the top wall 1004' of base 1004 of the main body portion includes an attachment means 1060. Attachment means 1060 comprises a base mount universal receiver with rotational coupling means 1061 and specialized universal serial bus wiring harness 1062 adapted to interchangeably mount and communicate with a mobile device 2000 having a system integrated therein that enables store level real-time inventory management and a fully functioning POS capability for selling merchandise in a retail sales environment and global inventory management. The base mount universal receiver with a rotational coupling means 1061 includes a rotating member 1065 for conversion of the mobile device from portrait mode to landscape mode without operational delay of the system.

Figure 9A:
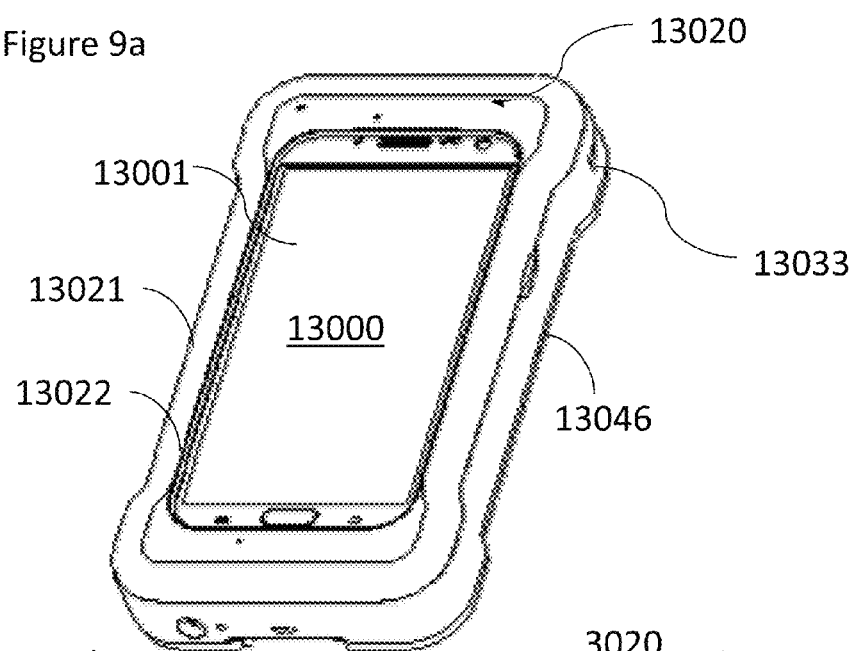
FIG. 9a illustrates a top view of an embodiment of the frame/casing around a mobile tablet device.
Figure 9B:
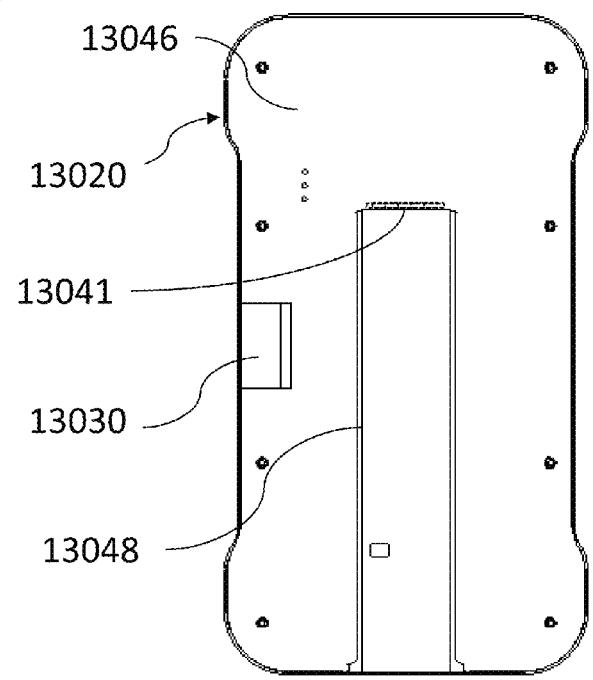
Figure 9C:
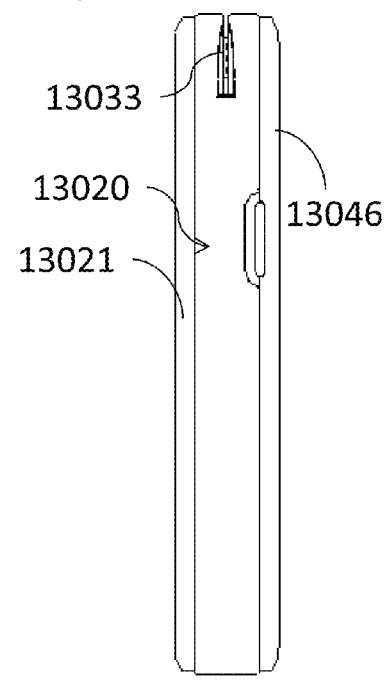
FIG. 9c illustrates a side view.
Figure 9D:
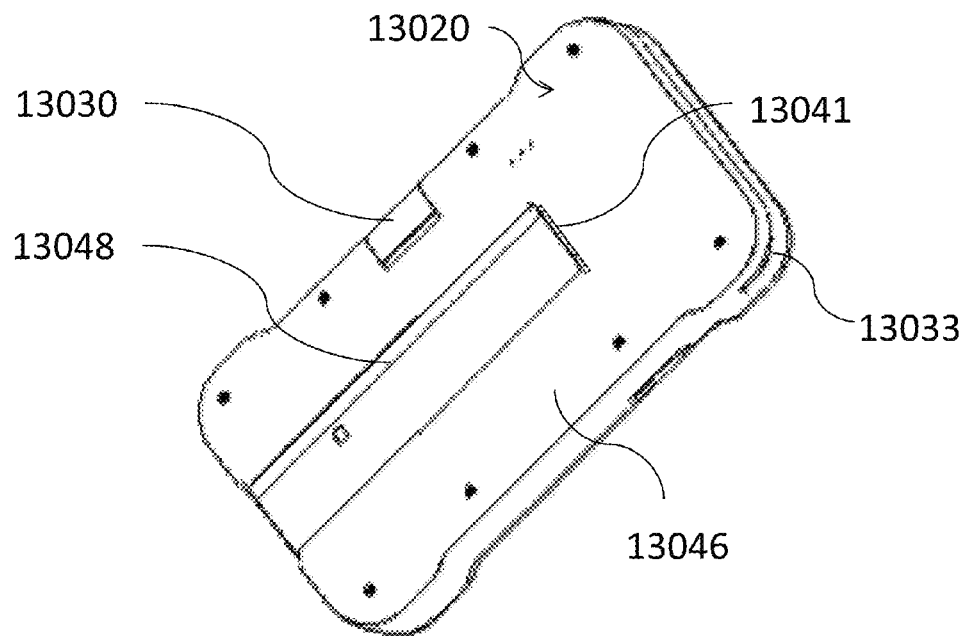
FIG. 9d illustrates a bottom-side view.
Figure 9E:
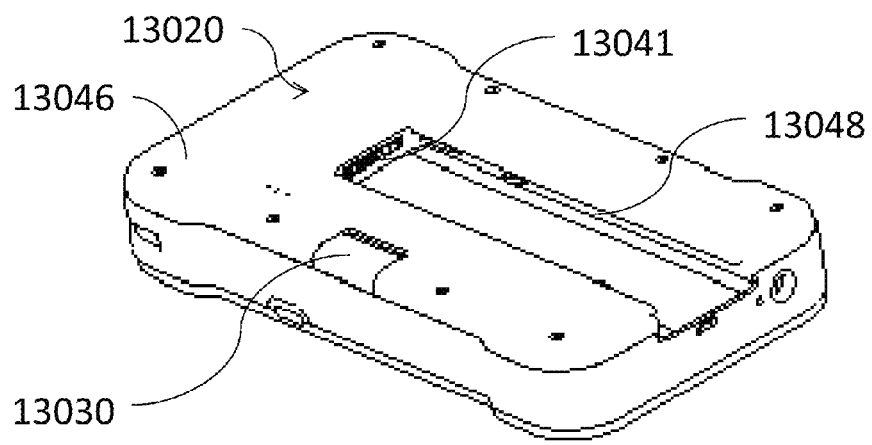
FIG. 9e illustrates another bottom-side view.

FIGS. 9*a*-9*e* illustrates views of and construction of the frame/casing for the mobile device. Particularly: FIG. 9*a* illustrates a top view of an embodiment of the frame/casing around a mobile device; FIG. 9*b* illustrates a bottom view of an embodiment of the frame/casing around a mobile device; FIG. 9*c* illustrates a side view; FIG. 9*d* illustrates a bottom-side view; and FIG. 9*e* illustrates another bottom-side view.

Referring to FIGS. 9*a*-9*e*, the mobile device is shown generally at 13000 and is preferably a mobile tablet device. The mobile tablet device 13000 includes a display screen 13001, preferably being a touch screen. The mobile tablet device 13000 is received and house within a case assembly 13020, and is preferably a customized mobile tablet device 13000, but it is contemplated that the device may be a currently offered device that fits within the case assembly 13020. Preferably the device 13000 can be removed from case assembly 13020, by use of the upper receiver release button 13030, as needed for interchangeability and replacement, or for docking at a fixed POS workstation. Preferably, case assembly 13020 is constructed having a rubberized frame, or otherwise sturdy durable material. The case assembly 13020 is preferably smooth and rugged to protect the mobile tablet device 13000 in a hostile store operation and provide optimal wear and usage as it is appointed to be used throughout the day on a sales floor, warehouse or the like.

Figure 10:
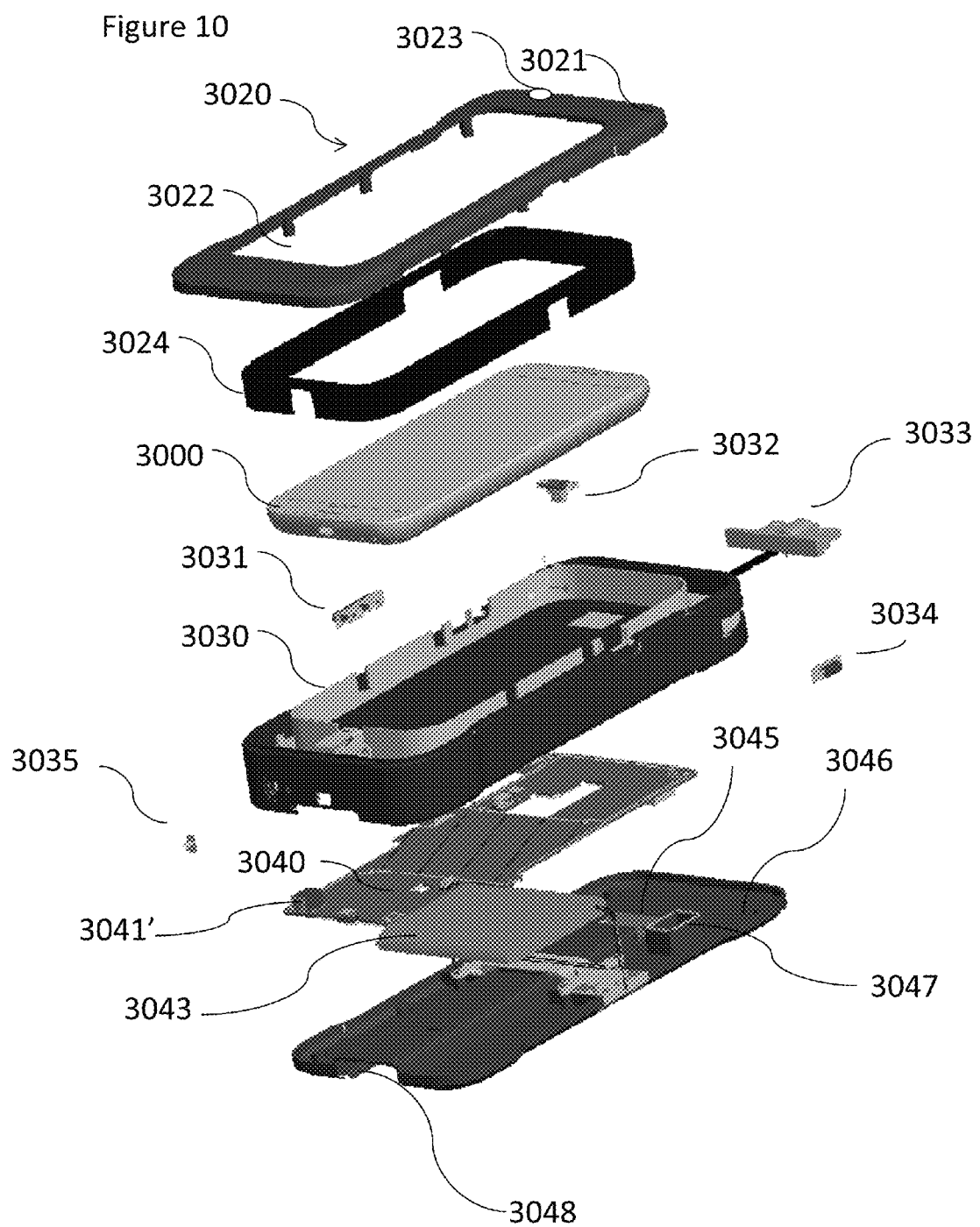
FIG. 10 illustrates a top view of an embodiment of the frame/casing forming around a mobile device.

Generally, case assembly 13020 is constructed having a front cover 13021 that is formed as a frame, and includes a screen cut-out 13022, mounted on a bottom cover 13046 thereby substantially encasing the mobile tablet device 13000 (for a representative in-depth construction of the case assembly, see FIG. 10 and the discussion herein relating to same). An MSR slot 13033 is integrated within case assembly 13020 for alignment with an MSR within case assembly 13020. A specialized universal serial bus wiring harness connector for communication and engaging the base mount universal receiver when the mobile tablet device 13000 is mounted on the pistol grip base housing shown at 13041. A quick release sliding mechanism 13048 (preferably being a tongue adapted to a receiver groove as a means to secure the mobile tablet device to the base device) is integrated within the bottom cover 13046.

FIG. 10 illustrates a top view of an embodiment of the frame/casing forming around a mobile tablet device, shown generally at 3000. Referring to FIG. 10, a case assembly 3020 is provided for receiving a mobile device 3000, preferably a customized mobile tablet device. Preferably the mobile device can be removed from case assembly 3020 as needed for interchangeability and replacement, or for docking at a fixed POS workstation. Preferably, case assembly 3020 is constructed having a rubberized frame, or otherwise sturdy durable material. The case assembly 3020 is preferably smooth and rugged to protect the mobile tablet device 3000 in a hostile store operation and provide optimal wear and usage as it is appointed to be used throughout the day on a sales floor, warehouse or the like.

Figure 11:
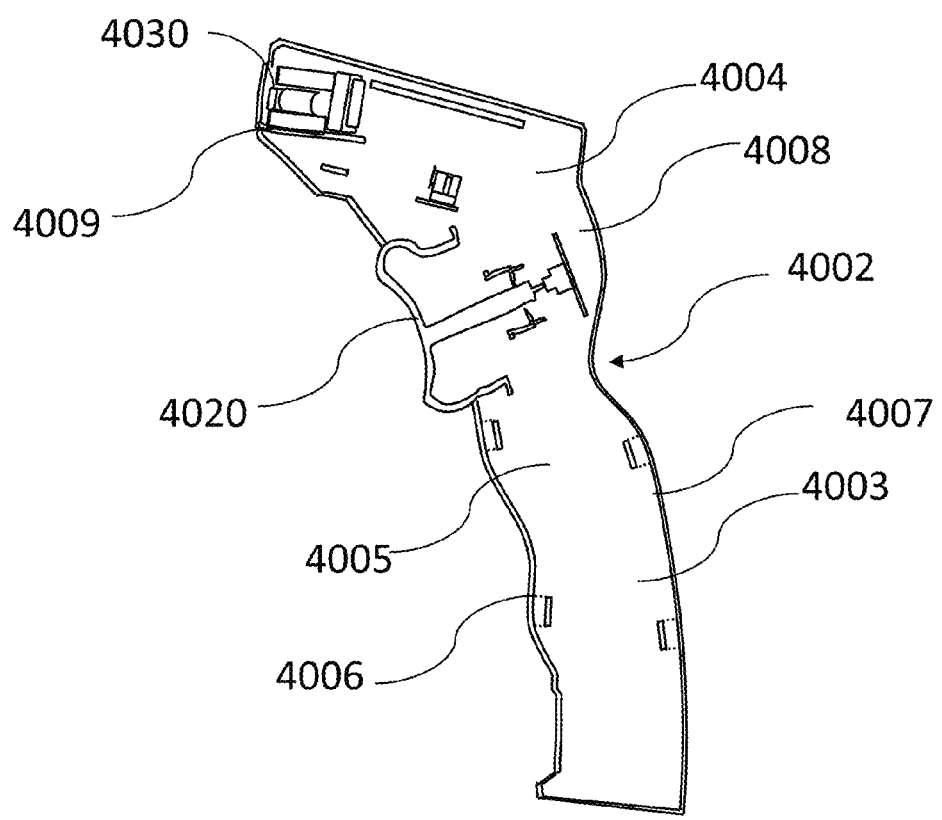
FIG. 11 shows a cross-section view of the body of the pistol grip base housing of FIG. 6.
Figure 12:
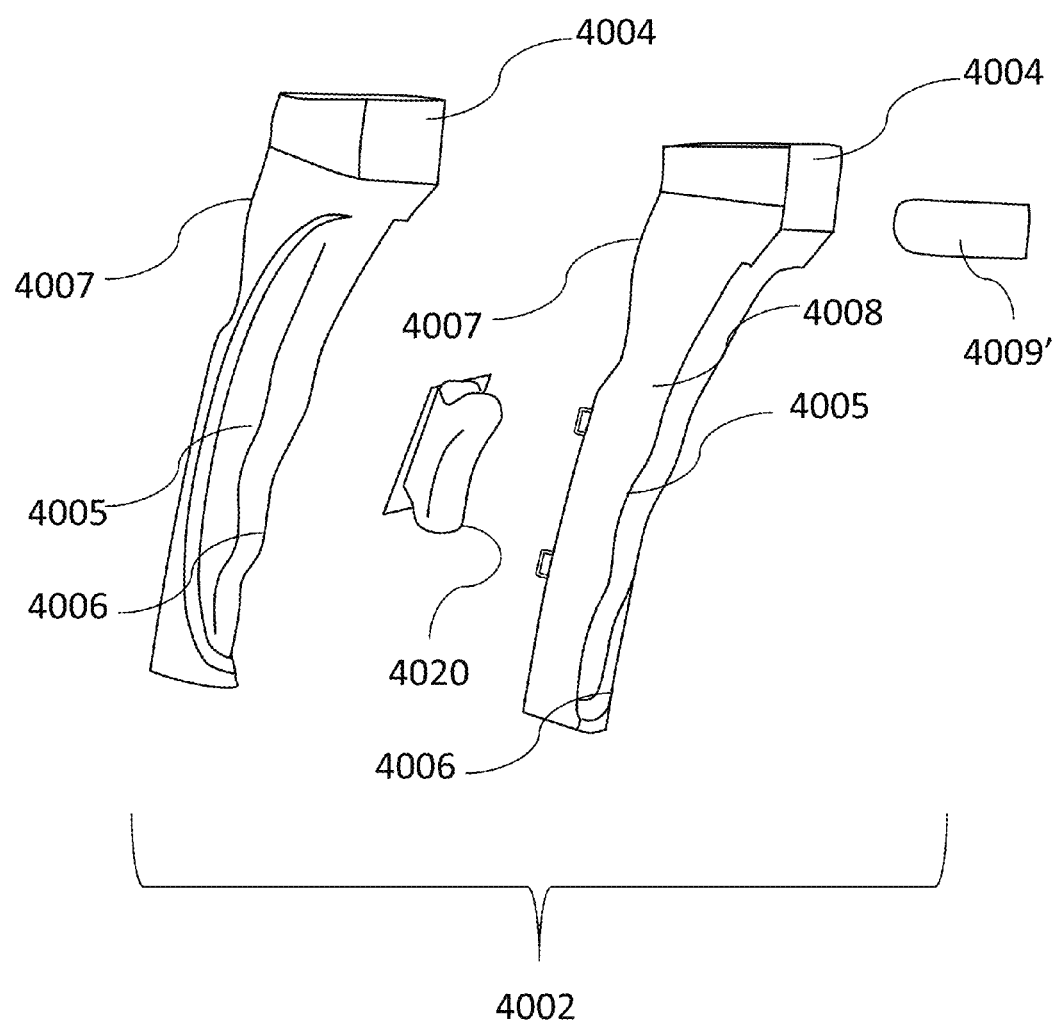
FIG. 12 shows views of the body and trigger assembly of the mobile scanner gun system.

Case assembly 3020 is constructed having a front cover 3021 that is formed as a frame, and includes a screen cut-out 3022 and MSR LED light guide 3023, that sits on a rubber boot 3024 casement which in turn encases the side walls of the mobile tablet device 3000. An over-molded internal chassis 3030 is provided for receiving the mobile tablet device 3000. Over-molded internal chassis 3030 is preferably composed of a PC substrate rubber over mold, and includes a volume button 3031, LED for MSR 3032, MSR 3033, power button 3034, and battery/charging indicator light guide 3035 cut-outs and parts assemblies. A Main PCB with connectors and DC jack 3041' is provided within a main board 3040, which is located directly under and mounted to the over-molded internal chassis 3030. An internal battery 3043 is provided, along with a sub-board 1 shown at 3045 for signal and power connections to the mobile scanner gun system, bottom cover assembly 3046 having a pocket for scanner buzzer 3047 and a quick release sliding mechanism 3048 (preferably being a tongue adapted to a receiver groove as a means to secure the mobile tablet device to the base device). Preferably, internal battery 3043 is a heavy duty component capable of powering operation of the mobile scanner gun system throughout substantially the entire shift; preferably for a time period ranging from 10 to 18 hours, and more preferably for a time period ranging from 12 to 16 hours FIGS. 11 and 12 show the cross-section view of the body of the gun of FIG. 6, and assembly thereof, respectively. A main body portion 4002 extending toward a handle portion 4003 is provided. Main body portion 4002 includes handle portion 4003, a base 4004, side walls 4005, a front wall 4006 and a back wall 4007 constructed to form an interior cavity 4008. Front wall 4006 includes an aperture 4009 with a lens 4009' for a scanner device 4030 and engine recessed therein. The front wall 4006 has a trigger member 4020 located near the base 4004 of the main body. Scanner device 4030 is mounted above and in front of the trigger 4020.

Figure 13:
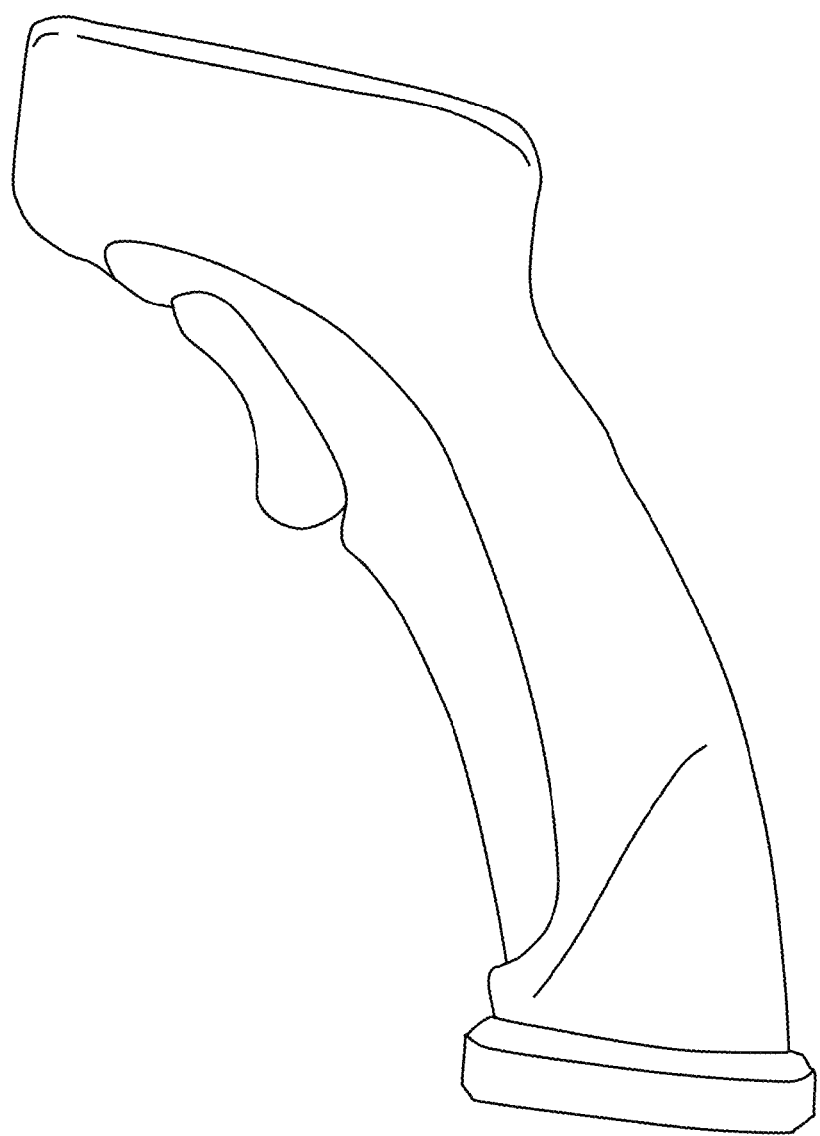
FIG. 13 shows a side view of an embodiment of a pistol grip of the subject mobile scanner gun system.
Figure 14:
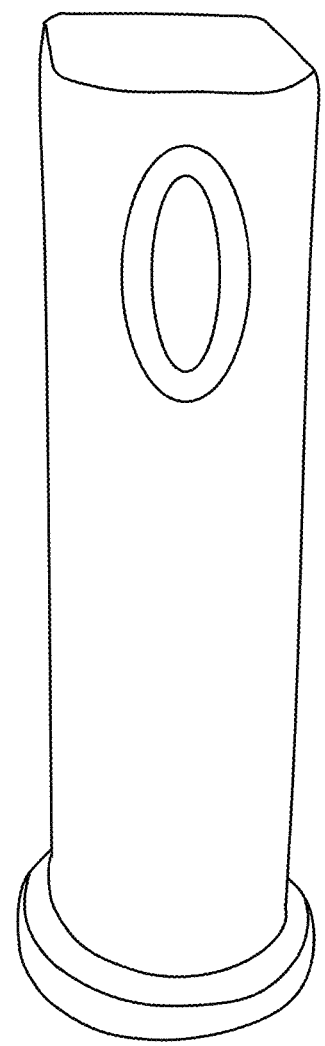
FIG. 14 shows a back view of an embodiment of the pistol grip of FIG. 13.
Figure 15A:
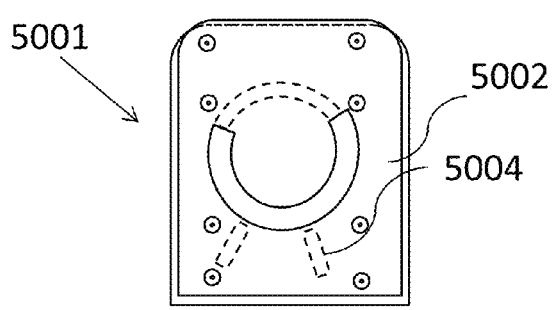
FIG. 15a-d illustrates the rotational mechanism of the subject mobile scanner gun system.
Figure 15B:
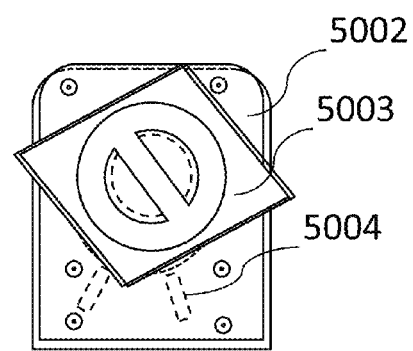
Figure 15C:
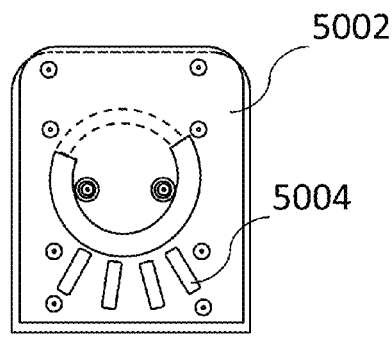
Figure 15D:
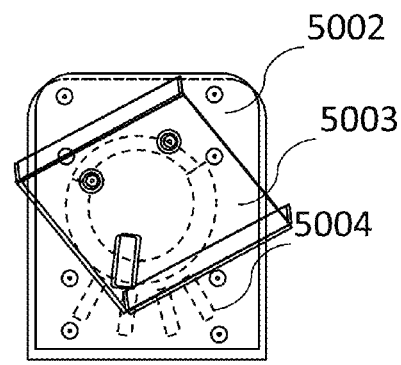

FIG. 13 shows a side view of an embodiment of a pistol grip of the subject mobile scanner gun system—which may be formed as a rubber/silicone cover. FIG. 14 shows a back view of an embodiment of the pistol grip of FIG. 13.

FIGS. 15*a-d* illustrates the rotational mechanism of the subject mobile scanner gun, shown generally at 5001. In the embodiment shown, a main body 5002 includes a spring plunger assembly, indicated generally at 5003 including detents 5004 used for fixed rotational interval positioning.

FIG. 16 is a schematic diagram illustrating an embodiment of the Main PCB circuit of the mobile scanner gun, shown generally at 6000. Main PCB 6001 is shown. Main PCB 6001 includes a battery 6002, Magtek MSR head 6003, USB to mobile tablet device 6004, USB to PC 6005, 5A DC jack 6006, Battery LED 6007, MSR LED 6008 (preferably via 3 pins) and connection to sub-board at 6009.

Figure 17:
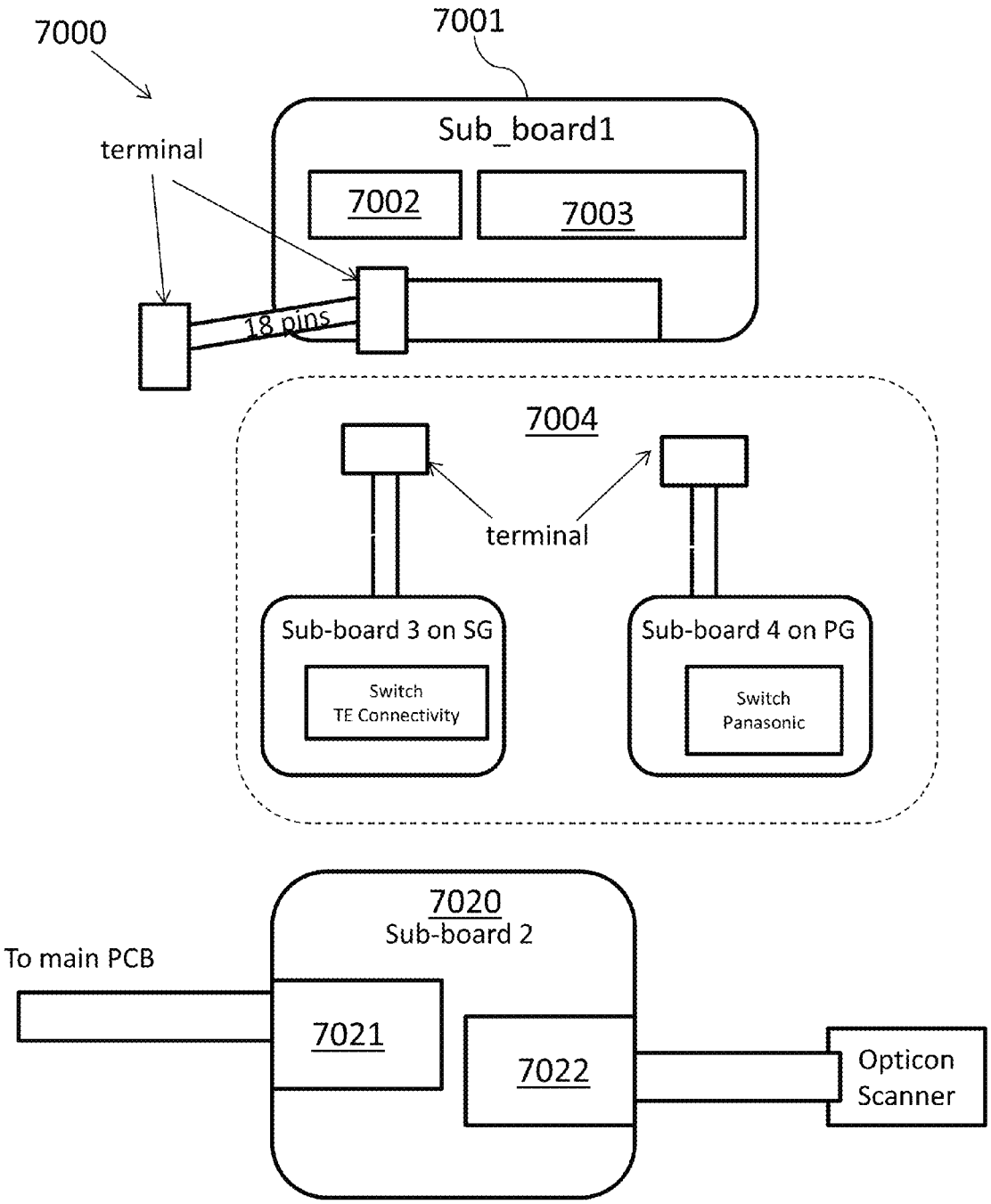
FIG. 17 is a schematic diagram illustrating an embodiment of the sub-boards 1 and 2 circuitry of the mobile scanner gun system.

FIG. 17 is a schematic diagram illustrating an embodiment of the sub-boards 1 and 2 circuitry of the mobile scanner gun system, shown generally at 7000. Sub board 1 is shown generally at 7001. Sub board 1 includes a specialized universal serial bus wiring harness for MSR 7002 and scanner/trigger (16 pin) 7003, and terminal 7004 (preferably 18 pins) with sub board 3 on SG (switch) and sub board 4 on PG (switch). Sub board 2 is shown generally at 7020. Sub board 2 includes a main PCB 7021 and Opticon scanner 7022.

Figure 18A:
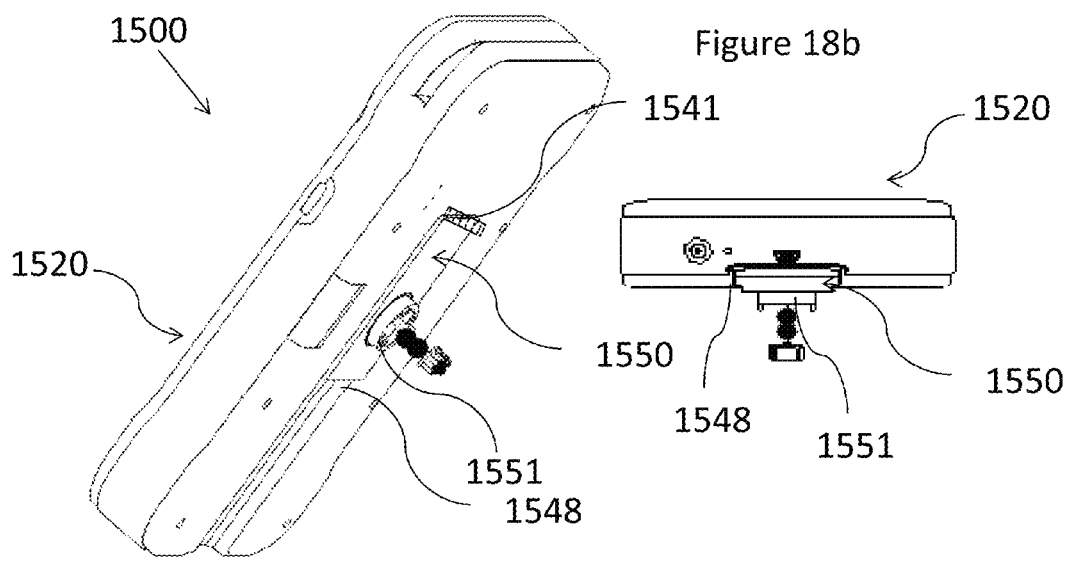
FIG. 18a illustrates a side elevation view of an embodiment of a mobile tablet device interchangeable on an embodiment of the subject mobile scanner system, shown with the interface device-inserted therein.
Figure 18B:
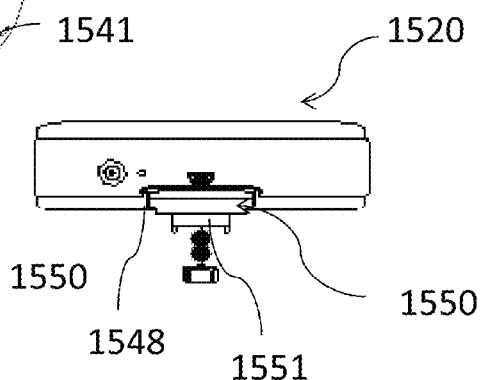
Figure 18C:
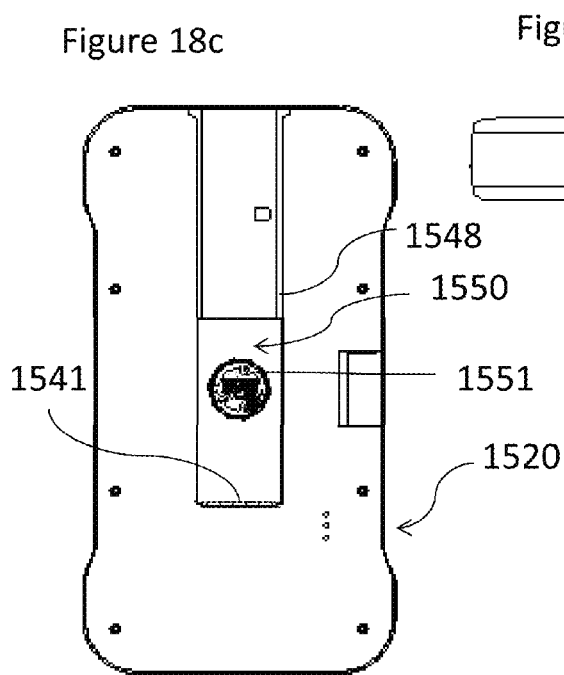
Figure 18D:
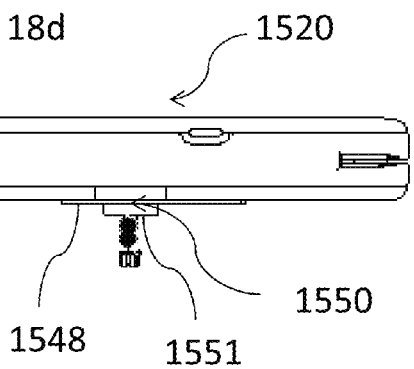

FIG. 18*a* illustrates a side elevation view of an embodiment of a mobile tablet device interchangeable on the subject mobile scanner gun system, shown with the interface device inserted therein, shown generally at 1500. FIGS. 18*b-d* illustrates views of the embodiment of FIG. 18*a*. Specifically, FIGS. 18*b* illustrates a back short side view, FIG. 18*c* illustrates a bottom view, and FIG. 18*d* illustrates a side view.

Referring to FIGS. 18*a*-18*d*, a mobile tablet device is received/housed within a case assembly shown at 1520. Case assembly 1520 is constructed having a front cover that is formed as a frame, and includes a screen cut-out and features as discussed herein. A main PCB with connectors /DC jack is provided 1541, located directly under and mounted to the over-molded internal chassis. Signal and power connection to the mobile scanner system is provided through interface device 1550. A quick release sliding mechanism 1548 is provided, preferably being a tongue adapted to receive groove of the interface device 1550, which in turn is adapted to be secured on the mobile scanner system. In the embodiment shown, a main body includes a spring plunger assembly, indicated generally at including detents used for interval rotational positioning and friction plates to assist in rotational stability and overall durability.

Figure 19A:
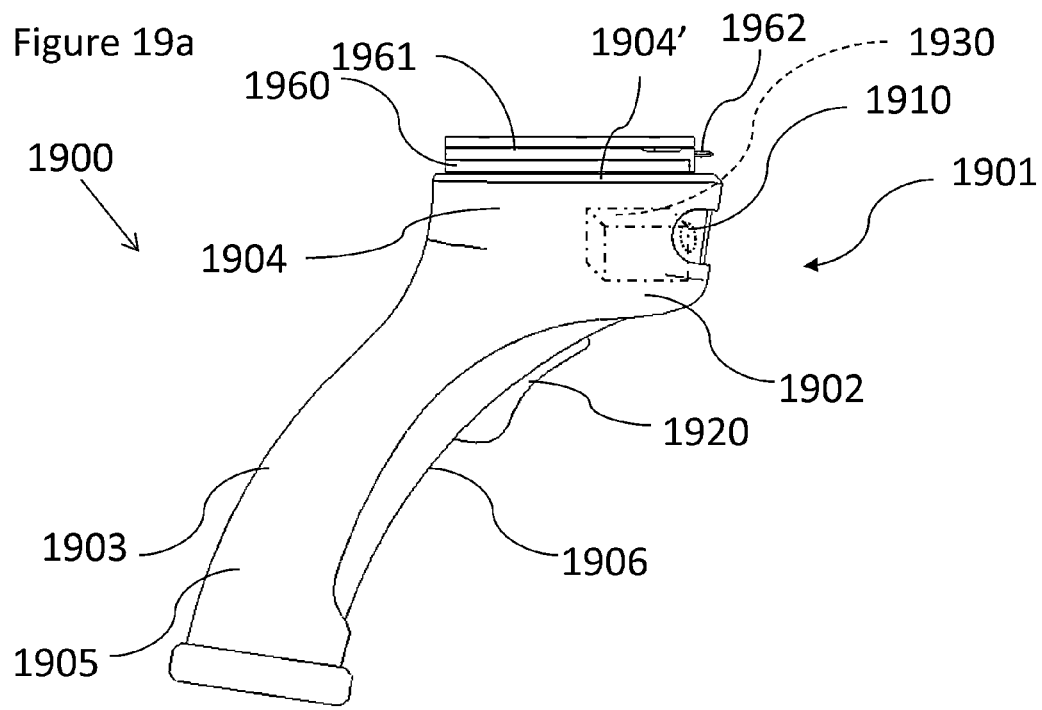
FIG. 19a illustrates a side elevation view of an embodiment of the subject mobile scanner gun system adapted to receive a mobile tablet device thereon, showing the base mount universal receiver with a rotational coupler.
Figure 19B:
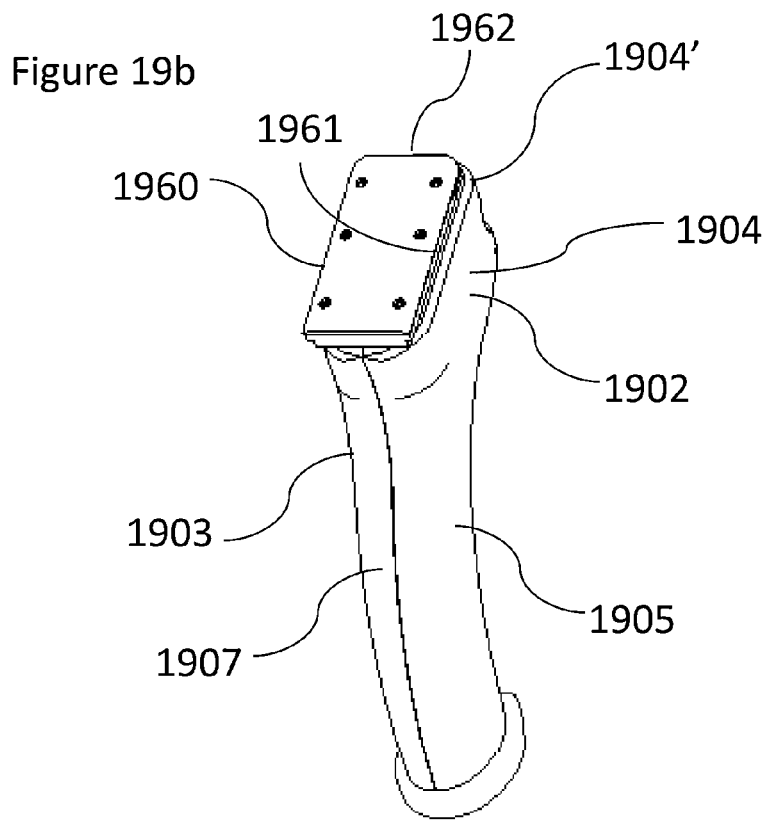
Figure 19C:
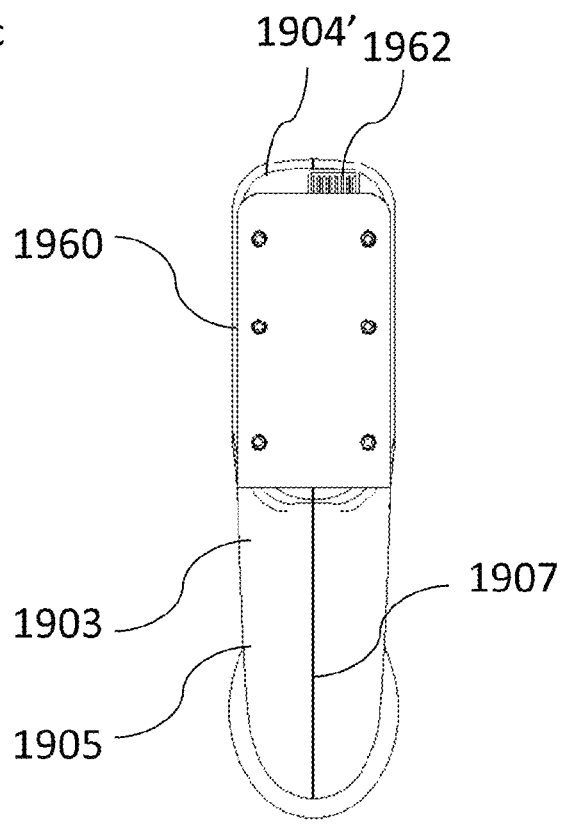
Figure 19D:
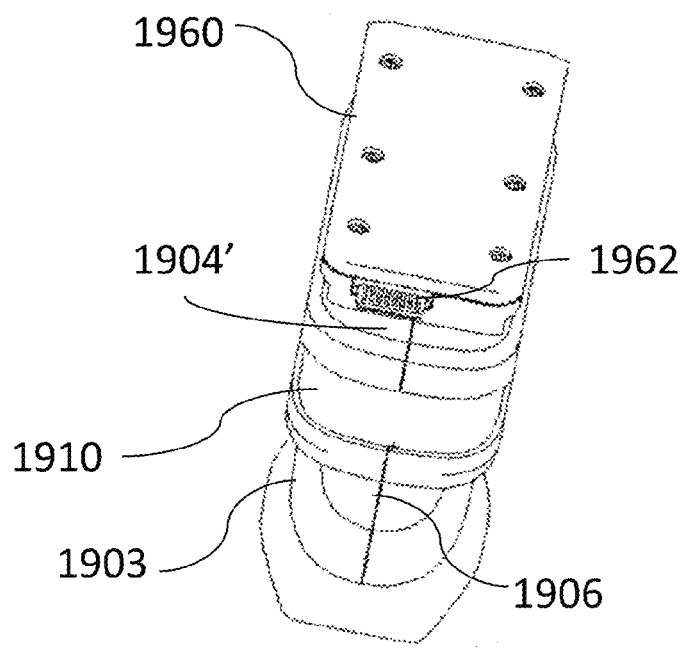
Figure 20A:
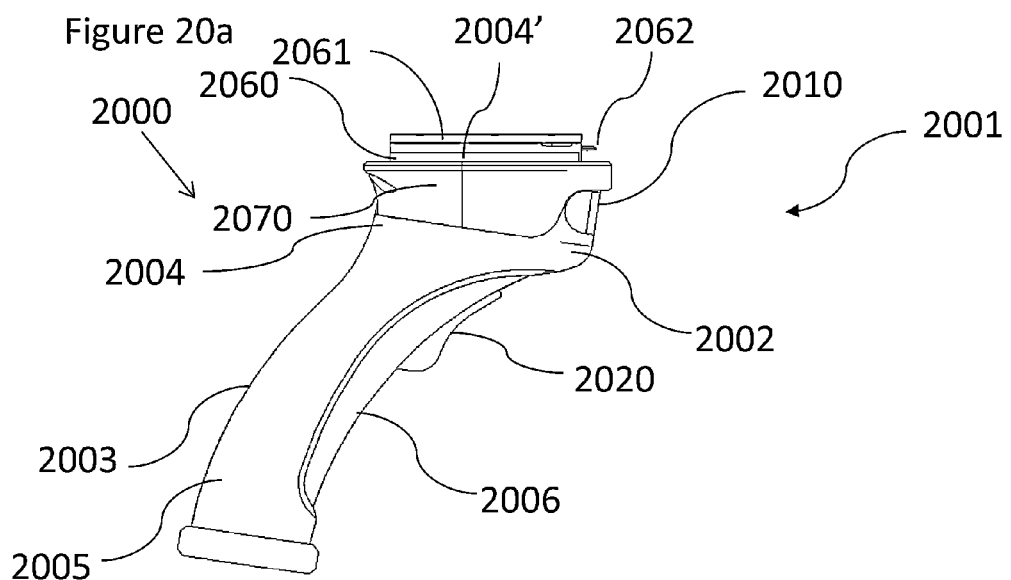
FIG. 20a illustrates a side elevation view of another embodiment of the subject mobile scanner gun system adapted to receive a mobile tablet device thereon, showing a modification add-on member—base mount universal receiver with rotational coupler.
Figure 20B:
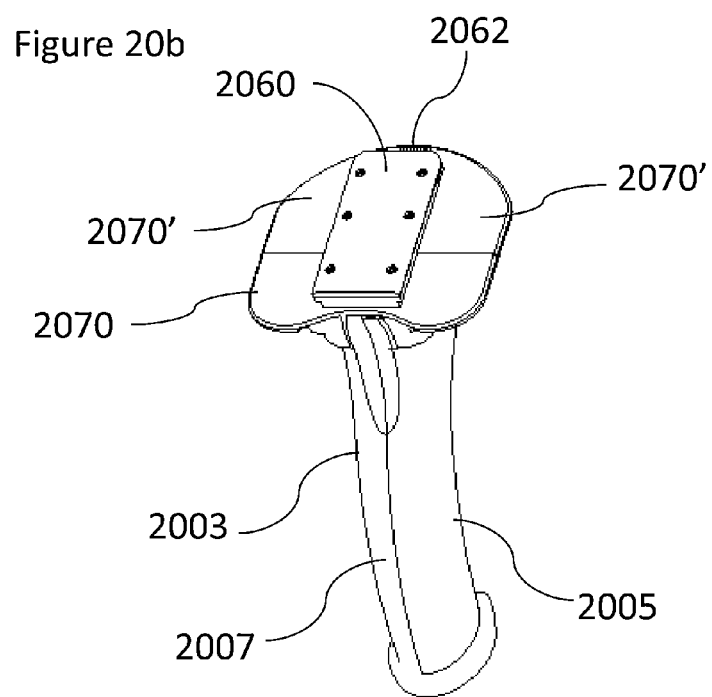
Figure 20C:
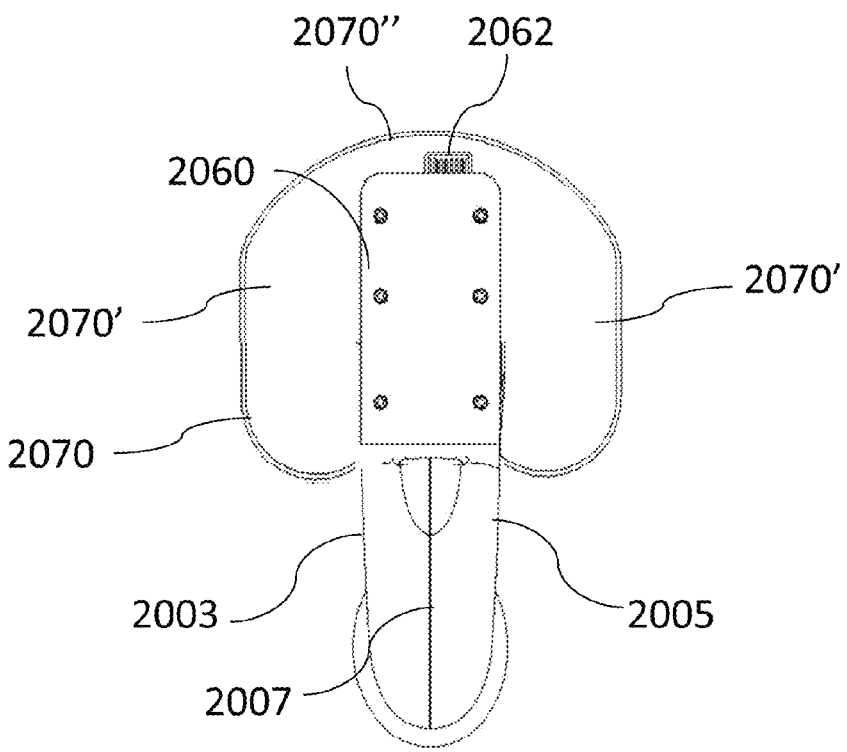
Figure 20D:
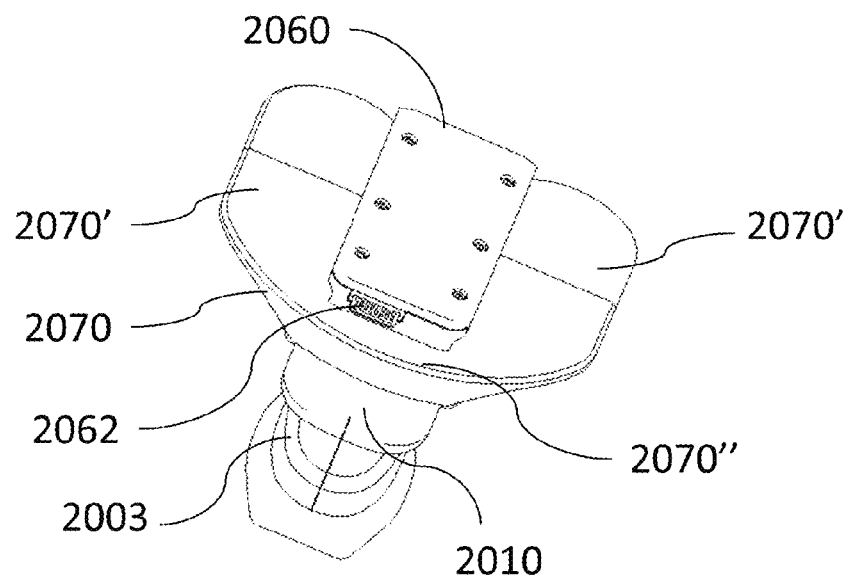

FIGS. 19*a*-19*d* illustrates views of an embodiment of the subject mobile scanner gun system, adapted to receive a mobile tablet device thereon, showing the pistol grip base housing at 1900. FIGS. 19*a* illustrates a side view, FIG. 19*b* illustrates a top back-side view, FIG. 19*c* illustrates a top back plane view, and FIG. 19*d* illustrates a top front-side view. Pistol grip base housing 1901 comprises a main body portion 1902 extending toward a handle portion 1903. Main body portion 1902 includes handle portion 1903, a base 1904, side walls 1905, a front wall 1906 and a back wall 1907 constructed to form an interior cavity. Front wall 1906 includes an aperture with a lens 1910 recessed therein. The front wall 1906 has a trigger member 1920 located near the base 1904 of the main body. A scanner 1930 is mounted above and in front of the trigger 1920. The scanner includes a scanner engine and has two drivers, including 1) a native device driver and 2) a keyboard input driver, the scanner device being in communication with the trigger for initiating a scan of a barcode.

Top wall 1904' of base 1904 of the main body portion includes an attachment means 1960. Attachment means 1960 comprises a base mount universal receiver with rotating coupling means 1961 and a specialized universal serial bus wiring harness connector 1962 adapted to interchangeably mount and communicate with a mobile tablet device having a system integrated therein that enables store level real-time inventory management and a fully functioning mobile POS capability for selling merchandise in a retail sales environment and real-time store level inventory management. The attachment means 1960 includes a rotating member (not shown) for conversion of the mobile device from portrait mode to landscape mode without operational delay of the system.

Referring to FIG. 16, the USB MSR input device software is integrated within the Main PCB for carrying out and processing sales transactions. Referring to FIGS. 1*a*-1*b*, preferably, the MSR itself is located directly above the scanner on the short side of the mobile tablet device upper receiver and is in communication through the EEPROM 6003.

FIGS. 20*a*-20*g* illustrate views of another embodiment of the subject mobile scanner gun system adapted to receive a mobile tablet device thereon, showing a modification add-on member and the pistol grip base housing, indicated generally at 2000. Referring to FIGS. 20*a*-20*g*, the pistol grip base housing 2001 comprises a main body portion 2002 extending toward a handle portion 2003. Main body portion 2002 includes handle portion 2003, a base 2004, side walls 2005, a front wall 2006 and a back wall 2007. Front wall 2006 includes an aperture with a lens 2010 recessed therein mounted in front of the scanner (FIG. 6 1030), located within the base 2004 of the main body portion 2002. The scanner includes a scanner engine and has two drivers, including 1) a native device driver and 2) a keyboard input driver, the scanner device being in communication with the trigger for initiating a scan of a bar code. The front wall 2006 has a trigger member 2020.

Base 2004 includes modification add-on members 2070 and 2070' located thereon a top wall 2004'. Modification add-on members 2070 and 2070' and visa vie top wall 2004' of base 2004 of the main body portion includes an attachment means 2060. Attachment means 2060 comprises a base mount universal receiver with rotational coupling base means 2061 and specialized universal serial bus wiring harness connector to the upper receiver 2062 adapted to interchangeably mount and communicate with a mobile tablet device having a system integrated therein that enables store level real-time inventory management and a fully functioning POS capability for selling merchandise in a retail sales environment. The attachment means 2060 includes a rotating member (not shown) for conversion of the mobile device from portrait mode to landscape mode without operational delay of the system. Referring to FIG. 20E an MSR device 2050 is integrated within the mobile tablet device 2100 and is in communication through the specialized universal serial bus wiring harness connector 2062 shown on FIG. 20*c*, for processing POS transactions.

Modification add-on member 2070 is adapted to provide a supplemental base support for mounting and securing the mobile tablet device 2100 on the scanner gun 2001 (see FIGS. 20*e*-20*g* for views including the mobile tablet device mounted thereon). Modification add-on member 2070 extends outwardly on the horizontal plane and adjacent from base 2004 to form a shelf 2070' running substantially parallel to the side walls 2005 of handle 2003. Preferably, modification add-on member 2070 further includes a front shelf 2070' adjacent to and under the base mount universal receiver with rotational coupling 2060 shown in FIG. 20c. Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A mobile scanner gun system for processing a retail store point of sale (POS) transaction, comprising:
   a) a main body portion extending toward a handle portion, said main body portion having a base, side walls, a top wall, a front wall and a back wall constructed to form an interior cavity, wherein said front wall includes an aperture with a lens recessed therein;
   b) said front wall having a trigger member located near said base of said main body;
   c) a Universal Serial Bus (USB) scanner input device mounted above and in front of said trigger, said scanner input device having two drivers, including 1) a native device driver and 2) a keyboard input driver, said scanner input device being in communication with said trigger for initiating a scan of a barcode;
   d) a USB Magnetic Strip Reader (MSR) input device for carrying out and processing sales transaction is located on an upper receiver alongside a short edge of a mobile tablet device and directly above a scanner, said MSR being end to end encrypted through to a bank card authorization processor for Payment Card Industry (PCI) compliance requirements;
   e) said top wall of said main body portion having a rotating attachment means comprising a base mount universal receiver with rotational coupling means adapted to interchangeably mount the mobile tablet device on said top wall through a specialized universal serial bus wiring harness and communicate with the mobile tablet device, the mobile tablet device having a system integrated therein that enables store level real-time inventory management and a fully functioning POS capability for selling merchandise in a retail sales environment, said universal receiver and specialized universal serial bus wiring harness with the mobile tablet device being removable from said top wall of said main body portion and adapted to be readily docked in different base housings including portable housings and fixed docked workstation housings thereby providing portability and interchangeability;
   f) said base mount universal receiver with rotational coupling means comprises a rotating member for conversion of said mobile tablet device from portrait mode to landscape mode without operational delay of said system.

2. The mobile scanner gun system for processing a retail store POS sales transaction as recited by claim 1 comprising a previously programmed Electrically Erasable Programmable Read-Only Memory (EEPROM) controlling all actions of said barcode scanner and said gun trigger for activating a scan operation of an item of interest to a customer by an employee of a retail establishment, wherein:
   (1) said scan operation is adapted to cause said EEPROM of a Main Printed Circuit Board (PCB) to communicate with said mobile tablet device, launching said application software to ready said mobile tablet device for receiving a scanned barcode;
   (2) said application communicates with said corporate Enterprise Resource Planning (ERP) system to obtain detailed information for daily inventory management purposes for such tasks as physical inventory, cycle counting, inventory receiving, store to store transfers, return to vendor and product re-ticketing;
   (3) said EEPROM's previously programmed instruction set present within said Main PCB is integrated with said mobile tablet device and processes commands issued by mobile applications to command either said barcode scanner or said MSR to acquire required data;
whereby the customer purchases a product from any retail store employee having said mobile scanner gun system receiving full product details, price, electronic and physical coupons, promotions, customer loyalty data and rewards and charges the purchase in a friendly, efficient, informative atmosphere without having the need to bring the product to a central checkout station and waiting in queue to check out.

3. The mobile scanner gun system for processing a retail store POS sales transaction as recited by claim 2, wherein said wireless communication may be in the form of Wi-Fi through a plurality of links located within the retail establishment and beyond or wireless cellular data plan through a standard cellular carrier.

4. The mobile scanner gun system for managing real-time daily store level inventory management daily functions, in real-time mode, as recited by claim 2, wherein said applications comprise an inventory management application in communication with the corporate enterprise resource planning (ERP) inventory management applications for managing real-time daily store level inventory management functions from a mobile device within any store location.

5. The mobile scanner gun system for processing retail store POS sales transaction as recited by claim 2, wherein said applications comprise a mobile POS application for processing customer check-out of purchases without consideration to the location of the inventory as the mobile POS application can initiate store and warehouse transfers, ship to customer location and special order from the vendor.

6. The mobile scanner gun system for processing a retail store POS sales transaction as recited by claim 5, wherein said StoreMS Mobile™ application provides access to current pricing, electronic or physical coupons, promotions, and customer loyalty data and rewards available to customer and end to end encrypted payment card processing.

7. The mobile scanner gun system for processing a retail store POS sales transaction as recited by claim 1, wherein said mobile device is a mobile tablet device with said mobile applications uploaded thereon.

8. The mobile scanner gun system for processing a retail store POS sales transaction as recited by claim 1, wherein said mobile device is a mobile tablet device having a display and wherein said mobile tablet device is attached and mounted to said pistol grip base housing through said base mount universal receiver with rotational coupling for system operation of said mobile scanner gun system and mobile tablet device for real-time daily store level inventory management and POS customer check-out of merchandise throughout the store and beyond its walls.

9. The mobile scanner gun system for processing a retail store POS sales transaction as recited by claim 1, wherein said mobile tablet device is capable of being removed from the mobile scanner gun system and attached to other mobile base housing systems, as well as docked on a fixed POS workstation at a cash-wrap station that are constructed and programmed to operate under said system.

10. The mobile scanner gun system for processing a retail store POS sales transaction as recited by claim 1, wherein said base mount universal receiver with rotational coupling means for mounting said mobile tablet device comprises a sliding mechanism via tongue and groove mating between said mobile tablet device upper receiver and said pistol grip base housing of said mobile scanner gun system.

11. The mobile scanner gun system for processing a retail store POS sales transaction as recited by claim 1, wherein said mobile tablet device is constructed having a rubberized frame.

12. The mobile scanner gun system for processing a retail store POS sales transaction as recited by claim 1, comprising a rubberized frame for housing said mobile device.

13. The mobile scanner gun system for processing a retail store POS sales transaction as recited by claim 12, wherein said rubberized frame for housing said mobile tablet device is smooth and rugged to protect said mobile device in a hostile store operation and provide optimal wear and usage as it is appointed to be used throughout the day on a sales floor.

14. The mobile scanner gun system for processing a retail store POS sales transaction as recited by claim 13, wherein said mobile tablet device may be a custom made OEM device affording all the ruggedness required in a hostile retail environment, thus eliminating the need for an external protective shell.

15. The mobile scanner gun system for processing a retail store POS sales transaction as recited by claim 1, wherein said mobile scanner gun system includes a wrist lanyard.

16. The mobile scanner gun system for processing a retail store POS sales transaction as recited by claim 1, wherein said mobile device measures about 2 inches to 10.5 inches diagonally.

17. The mobile scanner gun system for processing a retail store POS sales transaction as recited by claim 1, wherein said mobile device measures 4 inches to 7 inches.

18. The mobile scanner gun system for processing a retail store POS sales transaction as recited by claim 1, wherein said mobile device measures about 5 inches to about 5.5 inches diagonally.

19. The mobile scanner gun system for processing a retail store POS sales transaction as recited by claim 1, wherein said mobile device is a mobile tablet device having an integrated case or unit to enable mounting upon said mobile scanner gun system.

20. The mobile scanner gun system for processing a retail store POS sales transaction as recited by claim 1, wherein said handle is constructed as a pistol handle.

21. The mobile scanner gun system for processing a retail store POS sales transaction as recited by claim 1, comprising a handle cover.

22. The mobile scanner gun system for processing a retail store POS sales transaction as recited by claim 1, wherein said trigger is constructed as a pistol grip base housing.

23. The mobile scanner gun system for processing a retail store POS sales transaction as recited by claim 1, comprising an integrated back-up battery.

24. The mobile scanner gun system for processing a retail store POS sales transaction as recited by claim 1, wherein said device includes a secondary battery located within the upper receiver housing of the mobile tablet device.

25. The mobile scanner gun system for processing a retail store POS sales transaction as recited by claim 24, wherein said mobile tablet device upper receiver includes a micro-USB connector for charging both the primary mobile tablet device battery and the secondary battery located within the upper receiver housing.

26. The mobile scanner gun system for processing a retail store POS sales transaction as recited by claim 1, wherein said mobile device is software secured and rendered useless outside said retail enterprise.

27. The mobile scanner gun system for processing a retail store POS sales transaction as recited by claim 1, comprising an RFID tag is imbedded in the Mobile scanner gun system to sound alarm if stolen.

28. The mobile scanner gun system for processing a retail store POS sales transaction as recited by claim 1, comprising a modification add-on member located thereon said pistol grip base housing of said main body portion adjacent and below the base mount universal receiver with rotational coupling.

29. The mobile scanner gun system for processing a retail store POS sales transaction as recited by claim 1, wherein said specialized universal serial bus wiring harness is used for charging a battery system.

30. A mobile scanner gun system for processing a retail store point of sale (POS) transaction, comprising:
   a) a main body portion extending toward a handle portion, said main body portion having a base, side walls, a top wall, a front wall and a back wall constructed to form an interior cavity, wherein said front wall includes an aperture with a lens recessed therein;
   b) said front wall having a trigger member located near said base of said main body;
   c) a Universal Serial Bus (USB) scanner input device mounted above and in front of said trigger, said scanner input device having two drivers, including 1) a native device driver and 2) a keyboard input driver, said scanner input device being in communication with said trigger for initiating a scan of a barcode;
   d) a USB Magnetic Strip Reader (MSR) input device for carrying out and processing sales transaction is located on an upper receiver alongside a short edge of a mobile tablet device and directly above a scanner, said MSR being end to end encrypted through to a bank card authorization processor for Payment Card Industry (PCI) compliance requirements;
   e) said top wall of said main body portion having an attachment means comprising a base mount universal receiver with coupling means adapted to interchangeably mount and communicate through a, specialized universal serial bus wiring harness with the mobile tablet device having a system integrated therein that enables store level real-time inventory management and a fully functioning POS capability for selling merchandise in a retail sales environment, said specialized universal serial bus wiring harness being capable of communicating with USB input devices, including said USB and USB MSR input devices, and engaging with said system of said mobile tablet device, said specialized universal serial bus wiring harness with the mobile tablet device being removable from said top wall of said main body portion and adapted to be readily docked in different base housings including portable housings and fixed docked workstation housings thereby providing portability and interchangeability.

* * * * *